(12) United States Patent
Xiong et al.

(10) Patent No.: US 9,504,088 B2
(45) Date of Patent: Nov. 22, 2016

(54) SYSTEMS, METHODS, AND DEVICES FOR DEVICE-TO-DEVICE DISCOVERY

(71) Applicant: INTEL IP CORPORATION, Santa Clara, CA (US)

(72) Inventors: Gang Xiong, Beaverton, OR (US); Huaning Niu, Milpitas, CA (US); Debdeep Chatterjee, Santa Clara, CA (US); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 133 days.

(21) Appl. No.: 14/316,156

(22) Filed: Jun. 26, 2014

(65) Prior Publication Data

US 2015/0085764 A1    Mar. 26, 2015

Related U.S. Application Data

(60) Provisional application No. 61/883,127, filed on Sep. 26, 2013.

(51) Int. Cl.
*H04W 4/00* (2009.01)
*H04W 76/06* (2009.01)
*H04W 24/04* (2009.01)
(Continued)

(52) U.S. Cl.
CPC .............. *H04W 76/068* (2013.01); *H04L 1/12* (2013.01); *H04L 5/0037* (2013.01); *H04L 5/0048* (2013.01); *H04L 5/0055* (2013.01); *H04L 47/12* (2013.01); *H04L 47/122* (2013.01); *H04L 67/025* (2013.01); *H04L 67/104* (2013.01); *H04W 24/04* (2013.01); *H04W 36/32* (2013.01); *H04W 40/24* (2013.01); *H04W 48/16* (2013.01); *H04W 72/0446* (2013.01);
(Continued)

(58) Field of Classification Search
None
See application file for complete search history.

(56) References Cited

U.S. PATENT DOCUMENTS

2011/0098043 A1*  4/2011  Yu .......................... H04W 60/00
                                                    455/435.1
2014/0127991 A1*  5/2014  Lim ..................... H04W 76/023
                                                    455/39
(Continued)

FOREIGN PATENT DOCUMENTS

WO    2012177002 A2    12/2012

OTHER PUBLICATIONS

Synchronization for D2D Discovery, 3GPP TSG RAN WG1 Meeting #74, Barcelona, Spain, Aug. 19-23, 2013, p. 1-12 (R1-133387).*
(Continued)

*Primary Examiner* — Phuongchau Ba Nguyen
(74) *Attorney, Agent, or Firm* — Stoel Rives LLP

(57) ABSTRACT

A user equipment (UE) includes a reference signal component, a guard period component, and a transmission component. The reference signal component is configured to randomly select a sequence for a reference signal for transmission in an open device-to-device discovery packet. The guard period component is configured to determine a first symbol signal for transmission during a first symbol of the device-to-device discovery packet. The first symbol comprises a partially punctured symbol. The transmission component is configured to transmit the device-to-device discovery packet. The device-to-device discovery packet includes the first symbol having the partially punctured symbol and a reference signal based on the randomly selected sequence.

5 Claims, 18 Drawing Sheets

(51) Int. Cl.
*H04L 5/00* (2006.01)
*H04L 12/801* (2013.01)
*H04W 72/04* (2009.01)
*H04W 48/16* (2009.01)
*H04W 40/24* (2009.01)
*H04W 88/08* (2009.01)
*H04W 36/32* (2009.01)
*H04L 29/08* (2006.01)
*H04L 1/12* (2006.01)
*H04L 12/803* (2013.01)
*H04W 92/20* (2009.01)

(52) U.S. Cl.
CPC ....... *H04W 72/0453* (2013.01); *H04W 88/08* (2013.01); *H04W 92/20* (2013.01)

(56) References Cited

U.S. PATENT DOCUMENTS

| | | | | | |
|---|---|---|---|---|---|
| 2014/0301307 | A1* | 10/2014 | Lee | ........................ | H04L 5/0055 370/329 |
| 2015/0049684 | A1* | 2/2015 | Kim | ........................ | H04W 4/008 370/329 |
| 2015/0146647 | A1* | 5/2015 | Chatterjee | ........................ | H04L 5/0032 370/329 |
| 2015/0264552 | A1* | 9/2015 | Xiong | ........................ | H04W 8/005 370/329 |

OTHER PUBLICATIONS

U.S. Appl. No. 61/866,504, Sanggook Kim and Kidong Lee, Offloading Proximity Server (PROSE) Traffic From E-UTRAN to WLAN, Aug. 15, 2013, p. 1-116.*
U.S. Appl. No. 61/865,967, Sanggook Kim and Kidong Lee, Offloading Proximity Server (PROSE) Traffic From E-UTRAN to WLAN, Aug. 14, 2013, p. 1-38.*
"Link-level Analysis of LTE-based D2D Discovery Design," Agenda for 3GPP TSG RAN WG1 Meeting, #74, Barcelona, Spain, Aug. 19-23, 2013, R1-132943.
"Techniques for DWD Discovery," Agenda for 3GPP TSG RAN WG1 Meeting, #74, Barcelona, Spain, Aug. 19-23, 2013, R1-133600.
"Design Guideline for DWD Discovery," Agenda for 3GPP TSG RAN WG1 Meeting, #74, Barcelona, Spain, Aug. 19-23, 2013, R1-133567.
"Synchronization for D2D discovery," Agenda for 3GPP TSG RAN WG1 Meeting, #74, Barcelona, Spain, Aug. 19-23, 2013, R1-133387.
Notification of Transmittal of the International Search Report and the Written Opinion of the International Searching Authority, or the Declaration for PCT/US2014/050220, filed Aug. 17, 2014.

* cited by examiner

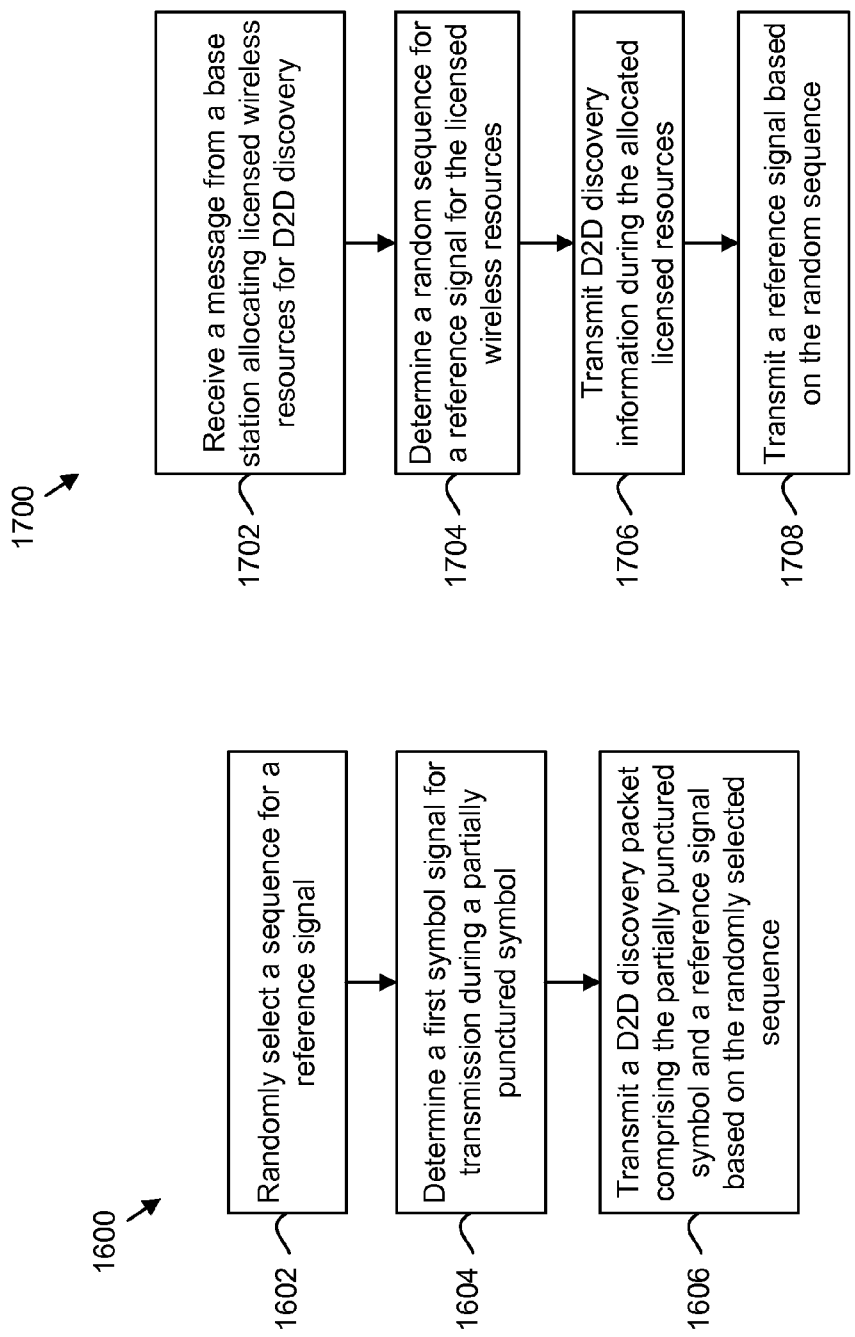

SYSTEMS, METHODS, AND DEVICES FOR DEVICE-TO-DEVICE DISCOVERY

RELATED APPLICATION

This application claims the benefit under 35 U.S.C. §119 (e) of U.S. Provisional Application No. 61/883,127, filed Sep. 26, 2013, which is incorporated by reference herein in its entirety.

TECHNICAL FIELD

The present disclosure relates to device-to-device communication.

BRIEF DESCRIPTION OF THE DRAWINGS

FIGS. 16-19 are schematic flow-chart diagrams illustrating methods for device-to-device (D2D) discovery consistent with embodiments disclosed herein.

DETAILED DESCRIPTION OF PREFERRED EMBODIMENTS

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In a 3GPP radio access network (RAN) according to LTE, the base station is termed Evolved Universal Terrestrial Radio Access Network (E-UTRAN) Node B (also commonly denoted as evolved Node B, eNodeB, or eNB). It may communicate with a wireless communication device, known as user equipment (UE). Although the present disclosure is presented with terminology and examples generally directed towards 3GPP systems and standards, the teaching disclosed herein may be applied to any type of wireless network or communication standard.

Figure 1:
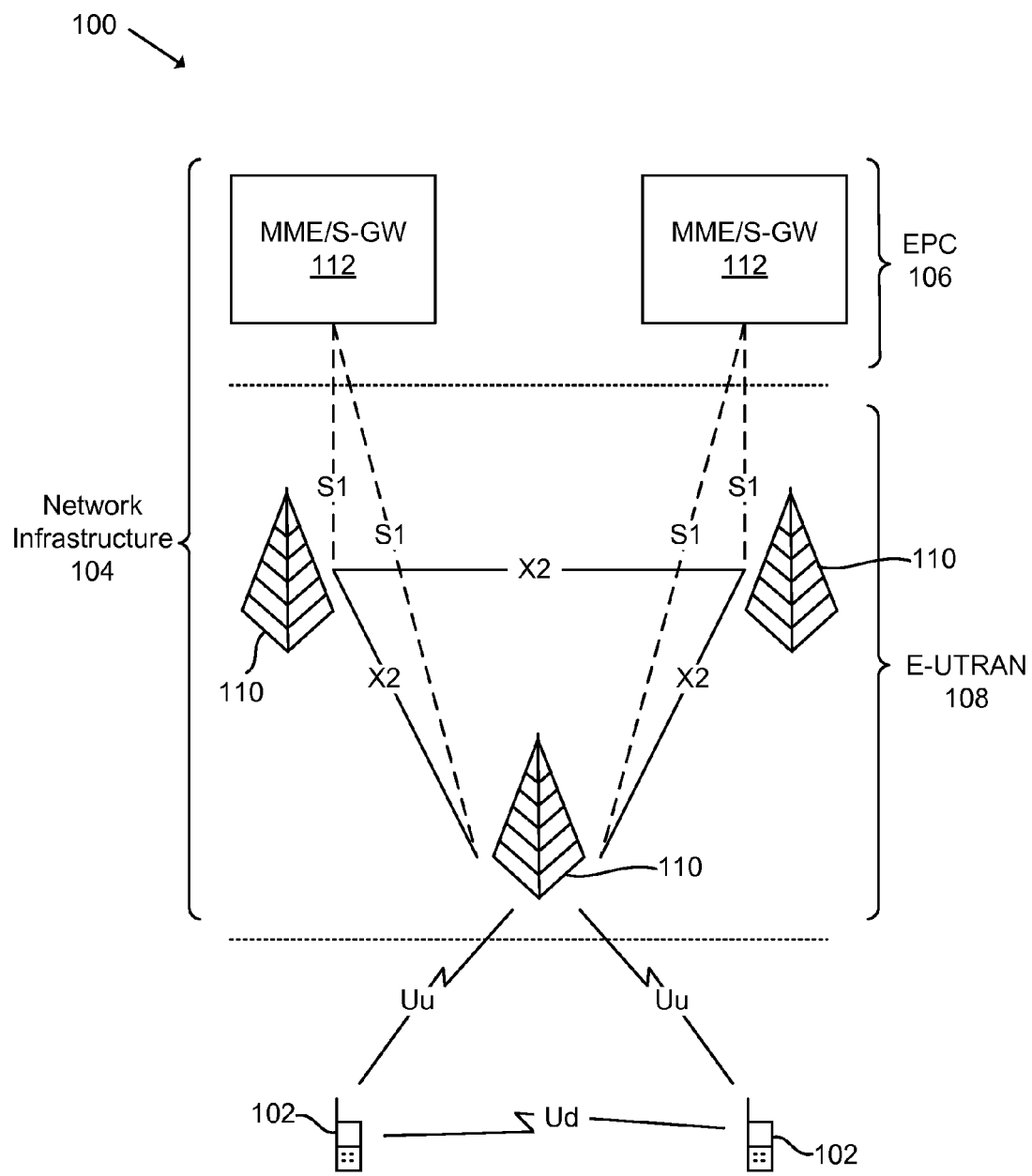
FIG. 1 is a schematic diagram illustrating a wireless communication system and environment consistent with embodiments disclosed herein.

FIG. 1 is a schematic diagram illustrating a communication system 100 that includes a plurality of UEs 102 in communication with network infrastructure 104. The network infrastructure 104 includes an evolved packet core (EPC) 106 and an E-UTRAN 108. The EPC 106 includes mobility management entities (MME) and serving gateways (S-GW) 112 that communicate with eNodeBs 110 in the E-UTRAN 108 over an S1 interface. The S1 interface as defined by 3GPP supports a many-to-many relation between EPC 106 and eNodeBs 110. For example, different operators may simultaneously operate the same eNodeB 110 (this is also known as "network sharing"). The E-UTRAN 108 is a packet switched 3GPP RAN for LTE (i.e., 3.9G) and LTE-Advanced (i.e., 4G) that was first introduced in 3GPP Release 8 and continues to evolve. In the E-UTRAN 108 the eNodeBs 110 are more intelligent than legacy Node Bs of a universal terrestrial radio access network (UTRAN) used in universal mobile telecommunication systems (UMTS or 3G). For example, almost all the radio network controller (RNC) functionality has been moved to the eNodeB rather than being in a separate RNC. In LTE, eNodeBs 110 are connected with each other by means of an X2 interface that allows the eNodeBs 110 to forward or share information.

The UEs 102 may include a radio that is configured to transmit and receive signals in a licensed wireless spectrum corresponding to the eNodeBs 110. The UEs 102 are in communication with an eNodeB 110 using a Uu air interface on a licensed cellular spectrum. The UEs 102 and eNodeBs 110 may communicate control data and/or user data with each other. A downlink (DL) transmission in an LTE network can be defined as a communication from the eNodeB 110 to the UE 102, and an uplink (UL) transmission can be defined as a communication from the UE 102 to the eNodeB 110.

In addition to DL and UL transmissions over the Uu interface, the UEs 102 are also shown communicating directly with each other over a Ud air interface. Direct communication between devices is commonly known as proximity services (ProSe), device-to-device (D2D) communication, or peer-to-peer (P2P) communication. In D2D, a UE 102 is able to communicate directly with another UE 102 without routing communications via an eNodeB 110 or the core network (e.g., EPC 106), as illustrated by the Ud D2D interface in FIG. 1. D2D is a powerful technique for increasing network throughput by enabling direct communications between mobile stations rather than using network infrastructure 104, and has a wide variety of applications. For example, D2D has been proposed for local social networks, content sharing, location-based marketing, service advertisements, public safety networks, mobile-to-mobile applications, etc. D2D communications are of interest due to their ability to reduce load on a core network (such as the EPC 106) or a radio access network (such as the E-UTRAN 108), increase data rates due to direct and short communication paths, provide public safety communication paths, and provide other functionality. In some embodiments, the UEs may be connected to different eNodeBs or to completely different networks operated by different mobile network operators (MNOs).

There are various alternatives to realize such a direct communication path between mobile devices. In one embodiment, the D2D air interface Ud could be realized by some type of short-range technology, such as Bluetooth or Wi-Fi, or by reusing licensed LTE spectrum, such as a UL spectrum. Furthermore, D2D communications can be generally divided into two parts. The first part is device discovery, whereby UEs 102 are able to determine that they are within range and/or available for D2D communication. Proximity detection may be assisted by network infrastructure 104, may be performed at least partially by the UEs 102, or may be performed largely independent of the network infrastructure 104. The second part is direct communication, or D2D communication, between UEs 102, which includes a process to establish a D2D session between UEs 102 as well as the actual communication of user or application data. D2D communication may or may not be under continuous control of an MNO. For example, the UEs 102 may not need to have an active connection with an eNodeB 110 in order to take part in D2D communications.

For D2D discovery, there are generally two different approaches: restricted D2D discovery (also known as closed D2D discovery) and open D2D discovery (also known as promiscuous D2D discovery). Restricted D2D discovery applies to use cases wherein a discoverable device may be discovered only by a select set of ProSe enabled discovering devices. For example, only pre-identified or selected devices may be allowed to connect, such as devices identified or selected by the network, a P2P server, an application, or a user. Thus, for this use case, a discovering device would be assumed to know, in advance, the ProSe enabled device it wishes to discover in its proximity, including any corresponding identifiers.

On the other hand, open device discovery considers use cases wherein a discoverable device may want itself to be discovered by any or all ProSe enabled devices in its proximity. From the perspective of the discovering device, open device discovery implies that a discovering device may not be assumed to be aware of the identity of other ProSe enabled devices prior to discovery. Consequently, the device discovery mechanism for open discovery may aim towards discovering as many ProSe enabled devices in its proximity as possible.

In certain situations, such as for open D2D discovery using licensed resources, an eNodeB has limited control of the discovery process among UEs. In particular, an eNodeB may periodically allocate certain discovery resources in the form of D2D discovery regions (e.g., time/frequency resources such as resource blocks or subframes) for UEs 102 to transmit the discovery information. The discovery information may be in the form of a discovery sequence or discovery packet with payload information.

In this application, applicants disclose systems, methods, and devices for D2D discovery and communication. In one embodiment, a UE includes a reference signal component, a guard period component, and a transmission component. The reference signal component is configured to randomly select a sequence for a reference signal for transmission in a device-to-device discovery packet. The guard period component is configured to determine a first symbol signal for transmission during a first symbol of the device-to-device discovery packet. The first symbol may include a partially punctured symbol. The transmission component is configured to transmit the device-to-device discovery packet that includes the partially punctured symbol and a reference signal based on the randomly selected sequence.

The present disclosure also discusses locations of reference signals within the discovery packet, such as an orthogonal frequency division multiplexing (OFDM) discovery packet. As used herein, the term "discovery packet" is given to mean a packet of information comprising a preamble or header and payload data. The term discovery packet is to be broadly construed as referring not only to a logical data structure but also to a logical resource structure. For example, the term discovery packet, as used herein, encompasses not only payload data but also physical layer signaling (such as reference signals) and control data.

Figure 2:
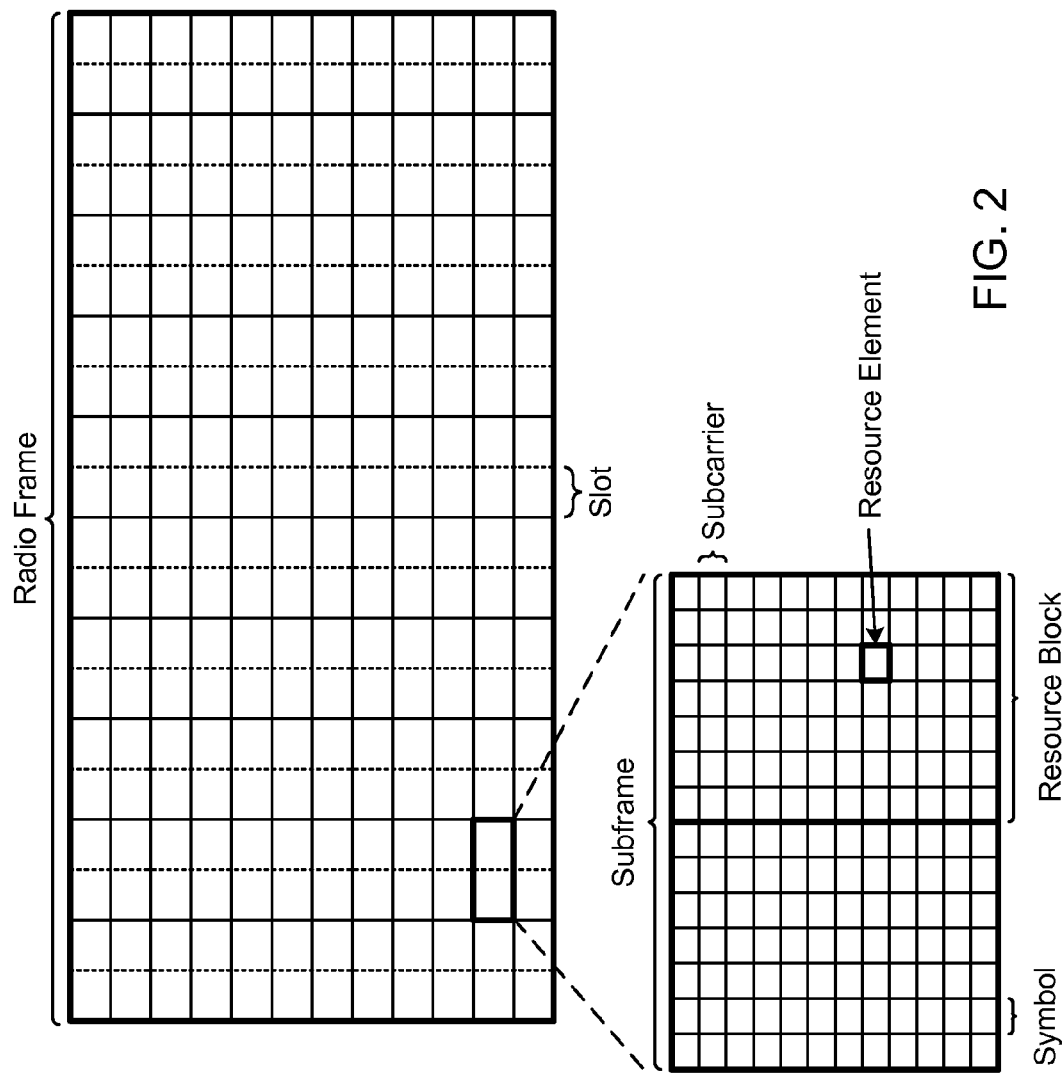
FIG. 2 is a schematic diagram illustrating a basic structure for a time-frequency resource consistent with embodiments disclosed herein.

As background, a discussion of resource structure may be helpful. FIG. 2 illustrates one embodiment of a basic structure for a time-frequency resource as defined in LTE. The resource includes a plurality of radio frames with a length of about 10 milliseconds (ms). Each radio frame includes a grid of subframes, each with a length of about 1 ms. Each subframe includes a plurality of subcarriers and symbols which form resource elements. In one embodiment, a subframe includes two slots, or resource blocks, which each span a plurality of symbols (seven time periods) and subcarriers (e.g., twelve frequency bands). In a normal cyclic prefix case, each resource block includes seven symbols, as depicted.

The above embodiments are given by way of example only. Further details and example embodiments will be discussed below.

Figure 3:
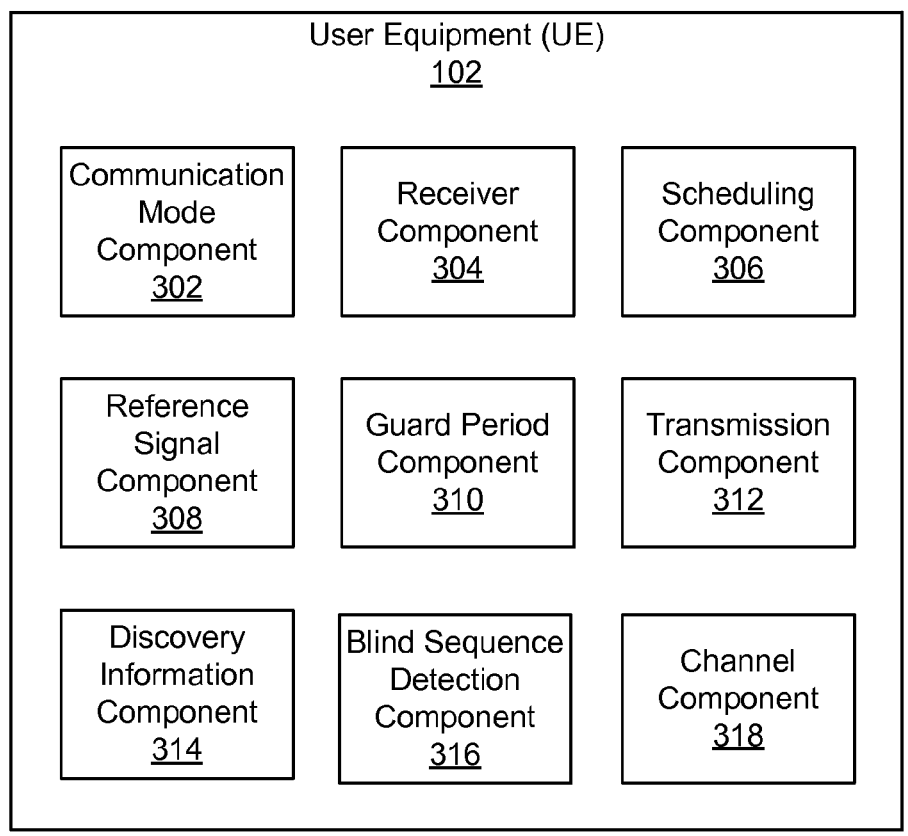
FIG. 3 is a schematic block diagram illustrating components of a wireless communication device consistent with embodiments disclosed herein.

FIG. 3 is a schematic block diagram illustrating one embodiment of a UE 102 configured for D2D discovery. The UE 102 includes a communication mode component 302, a receiver component 304, a scheduling component 306, a reference signal component 308, a guard period component 310, a transmission component 312, a discovery information component 314, a blind sequence detection component 316, and a channel component 318. The components 302-318 are shown by way of example and may not all be included in all embodiments. In some embodiments, only one or any combination of two or more of the components 302-318 may be included.

The communication mode component 302 controls a communication mode of one or more radios of the UE 102. In one embodiment, the UE 102 may include one or more two-way radios and/or antennas for receiving and uploading data to the network infrastructure 104. In one embodiment, the same radio or antenna may be used for both signal transmission and reception, but generally not at the same time. The communication mode component 302 is configured to switch the respective radios from a reception mode to a transmission mode and from a transmission mode to a reception mode, as needed. The process of ramping up or ramping down power in a radio or on an antenna to place it in a desired mode takes some time and thus there is often a need for a guard period or puncturing of a resource structure to allow for the switch. According to agreement by the LTE radio layer 1 (RAN1) working group, $T_S \times 624$ is assumed for both transmission mode to reception mode switching and reception mode to transmission mode switching. This amount of time is meant to allow for communication mode switching times as well as propagation delays for receiving transmitted signals. Ts is the basic time unit with $$T_S = \frac{1}{(15000 \times 2048)} \text{ seconds}$$

so that $T_S \times 624 \approx 20$ microseconds (μs). Thus, in some situations, a guard period may be included to allow for the switch in communication modes and propagation delays. Further discussion of guard periods will take place in relation to the guard period component 310.

The receiver component 304 is configured to receive information or signals received by an antenna or radio of the UE 102. For example, the receiver component 304 may receive DL signals from an eNodeB 110 or may receive signals transmitted by a peer UE when a corresponding radio is in a reception mode. In one embodiment, the receive component 304 may provide received information to other components 302, 306-318 as appropriate.

The scheduling component 306 is configured to receive a message scheduling usage of one or more wireless resources. In one embodiment, the scheduling component 306 may receive a control message from an eNodeB 110 indicating that a specific portion of licensed wireless resources is to be used for a specific purpose. For example, the scheduling component 306 may receive a message from 3GPP LTE network infrastructure 104 allocating wireless resources licensed by an MNO for device-to-device discovery. The scheduling component 306 may determine whether the UE 102 needs to participate in device-to-device discovery. If the scheduling component 306 determines a need to establish a D2D session, the scheduling component 306 may schedule the allocated resources for transmitting discovery information or listening for discovery information transmitted by a peer UE.

The reference signal component 308 may determine or generate a reference signal for transmission. Reference signals are often included in wireless transmission to allow receiving devices to estimate the channel, synchronize in time, synchronize in frequency, or the like. Example reference signals in LTE include sounding reference signals (SRS) and demodulation reference signals (DM-RS). In some cases, reference signals include signals based on a basic sequence and modified by a cyclic shift or orthogonal cover code to reduce interference and allow a receiving device to distinguish the transmission from transmissions of other devices. Generally, a sequence and modifications (e.g., cyclic shift or orthogonal cover code) are preconfigured or predefined (e.g., by a communication standard or by previous physical layer or higher layer signaling) such that a UE 102 knows what reference signal sequence to use, and devices or systems interested in receiving transmissions know what to expect.

However, in some situations, such as for open discovery, devices may not be listening for a specific UE or reference signal sequence. Because the transmitting UE and the receiving UE may not even be aware of each other, they may not be able to determine what sequence will be used for a reference signal. In one embodiment, if no specific sequence is indicated, the reference signal component 308 randomly selects a sequence for transmitting a D2D discovery transmission. For example, the reference signal component 308 may randomly select a cyclic shift or an index for an orthogonal cover code and allow a receiving UE to blindly determine what cyclic shift or orthogonal cover code was used. In one embodiment, a basic sequence may be configured by network infrastructure 104 or by a protocol, and the reference signal component 308 may randomly select a modification to the basic sequence to transmit. In one embodiment, the reference signal component 308 may randomly select a sequence for a reference signal for transmission during a resource allocated by an eNodeB 110 for device-to-device discovery. Further details of reference signals, sequence selection, and reference signal generation will be discussed in relation to the blind sequence detection component 316 and later figures.

The guard period component 310 is configured to determine a guard period for a D2D discovery period. For example, the guard period component 310 may determine a guard period for a first symbol of an OFDM resource allocated for discovery. In one embodiment, resources allocated for D2D discovery may be located following another resource block or frame where a UE needs to switch a communication mode. For example, the UE 102 may be receiving a DL communication from an eNodeB 110 in the previous subframe or frame and may need to ramp up power on the same radio to transmit a discovery packet during the resource allocated for D2D discovery. Similarly, the UE 102 may be transmitting a UL communication in the previous sub frame or frame and may need to ramp down power on the same radio to listen for a discovery packet during the resource allocated for D2D discovery.

In one embodiment, the guard period component 310 is configured to determine a first symbol signal for transmission during a first symbol of the device-to-device discovery packet. The guard period component 310 may receive an indication of a reference signal and/or data to be transmitted during the first symbol and generate the first signal or determine a structure of the first signal within the first symbol. In one embodiment, the guard period component 310 determines a signal for a partially punctured first symbol. The term punctured is given to mean that the basic resource structure is modified to prohibit or limit a requirement to transmit or receive data during the punctured portion of the resource. For example, even if a signal is transmitted during a punctured portion, a receiving device may be able to receive the same data during a non-punctured portion of the resource structure. On the other hand, transmission or reception during the punctured portion may be prohibited.

In one embodiment, the guard period component 310 determines the signal for the first symbol by determining or generating a repeating signal for the first symbol. For example, the signal for the first symbol may include a repeating reference signal or a repeating data signal. The reference signal or data may be repeated twice within the first symbol to allow transmitting or receiving devices to transmit or receive the second transmission. For example, if a UE 102 was transmitting in a resource block immediately preceding a resource allocated for discovery, the UE 102 may finish transmission, and the communication mode component 302 may switch the corresponding radio to a reception mode. However, due to the delay in switching, the UE 102 may not be able to receive a first portion of a signal transmitted in the first symbol. By the time the second iteration or repetition of the signal begins, the UE 102 is ready to receive the signal, and no data or information is lost because the missed portion is repeated. In one embodiment, the signal may be repeated two, three, or more times in the first symbol to allow for devices to switch, if needed. In one embodiment, the guard period component 310 may drop a last repetition of a signal and move the signal backwards by the length of the dropped repetition to provide for a punctured first symbol (e.g., see FIGS. 4 and 5). For example, a cyclic prefix (CP) and first repetition block may be moved backwards in time, and a last repetition may be dropped from the first symbol.

In one embodiment, the guard period component 310 generates a guard period by determining a signal for the first symbol that does not include power or information in a first portion of the first symbol but has power or information during a second portion of the first symbol. For example, the first portion may correspond to an amount of time that allows for communication mode switching, such as $T_S \times 624$ as discussed above. In one embodiment, the first portion has a length of about 20 ms or more. In one embodiment, the first portion has a length corresponding to about one-third of a time length of the first symbol. For example, the first symbol may have a length of about 1 ms divided by 14 (for 14 symbols), or $$\frac{1 \text{ ms}}{14 \text{ symbols}} \approx 71 \text{ } \mu s.$$

Thus, the first portion may have a length of $$\frac{71 \text{ } \mu s}{3} \approx 20 \text{ } \mu s.$$

In one embodiment, the first portion has a length corresponding to about one-half of a time length of the first symbol. Thus, the first portion may have a length of $$\frac{71 \text{ } \mu s}{2} \approx 35.5 \text{ } \mu s.$$

In one embodiment, the guard period component 310 generates a guard period based on interleaved frequency division multiple access (IFDMA).

In one embodiment, the guard period component 310 may also create a guard period in a last symbol of discovery to allow for timing changes or communication mode switches at an end of D2D discovery.

The transmission component 312 is configured to transmit signals using a radio or antenna of the UE 102. In one embodiment, the transmission component 312 transmits a discovery packet based on information received or provided by other components of the UE 102. For example, the transmission component 312 may transmit a discovery packet during a resource scheduled by the scheduling component 306. In one embodiment, the transmission component 312 transmits reference signals determined by the reference signal component 308 within a discovery packet. In one embodiment, the transmission component 312 receives data or signal information, and maps the data or signals to appropriate blocks in a resource structure based on a physical layer protocol. For example, the transmission component 312 may transmit a discovery packet with reference signals, data, and/or unused symbols as required by the LTE physical layer or as otherwise specified herein.

In one embodiment, the transmission component 312 is configured to transmit a D2D discovery packet with a guard period at the beginning of the transmission. For example, the transmission component 312 may transmit a D2D discovery packet in an OFDM structure, such as in an OFDM resource block or subframe, with a partially punctured first symbol. In one embodiment, the transmission component 312 transmits the first symbol of the discovery packet without power on one or more of the subcarriers during the first symbol. For example, a fraction of the plurality of subcarriers may be unused during the whole first symbol. In one embodiment, the fraction of unused subcarriers may be calculated by $$\frac{RPF - 1}{RPF},$$

where RPF is the repetition factor that determines how many times a reference signal or data signal is repeated in the first symbol.

In one embodiment, the transmission component 312 transmits a reference signal with a discovery packet. For example, the transmission component 312 may transmit the reference signal within an OFDM resource block comprising at least a portion of discovery information for the UE 102. In one embodiment, the transmission component 312 transmits the reference signal during the first symbol of the allocated discovery resource. For example, the transmission component 312 may transmit a reference signal based on a randomly selected sequence selected by the reference signal component 308 during the first symbol. In one embodiment, the transmission component 312 transmits the reference signals during a first symbol of each resource block of the resources allocated for D2D discovery, such as the first and eighth symbols of a subframe. In one embodiment, the transmission component 312 transmits the reference signals during a fourth symbol of each resource block of the resources allocated for D2D discovery, such as the fourth and eleventh symbols of a subframe. In one embodiment, the transmission component 312 transmits a reference signal and discovery data as part of an open discovery packet.

The discovery information component 314 is configured to obtain D2D discovery information. For example, the discovery information component 314 may receive a discovery packet for open D2D discovery transmitted by a peer UE during a resource allocated for D2D discovery. In one embodiment, the discovery information includes an identifier for the peer UE that transmitted the discovery information. The identifier may be used by the UE 102 to transmit a request to establish a D2D session with the corresponding UE. In one embodiment, the discovery information includes a reference signal that was generated using a reference signal sequence that is unknown to the receiving UE 102. For example, the transmitting UE may have transmitted the reference signal based on a randomly selected sequence, as discussed above in relation to the reference signal component 308.

The blind sequence detection component 316 is configured to determine an unknown sequence for a received reference signal. For example, the blind sequence detection component 316 may determine a cyclic shift or orthogonal cover code used to generate a reference signal received in a discovery packet. In one embodiment, the blind sequence detection component 316 determines the unknown sequence by comparing the received reference signal with reference signals generating known cyclic shifts or orthogonal cover codes. For example, a basic sequence for the discovery packet may be known, but the specific cyclic shift or orthogonal cover code may be unknown. In one embodiment, if UL DM-RSs are received as the reference signal for D2D discovery, a DM-RS blind detection algorithm which targets to find a candidate sequence with maximum correlation energy to the actual received reference signal can be employed to determine the cyclic shift of the DM-RS sequence of the transmit UEs. In one embodiment, the blind sequence detection component 316 may determine the unknown sequence by attempting to interpret the reference signal using one or more potential cyclic shifts or orthogonal cover codes for a known basic sequence. For example, the blind sequence detection component 316 may attempt to interpret using a first potential cyclic shift and, if unsuccessful, try a second potential cyclic shift, and so on until the correct cyclic shift is attempted. Similar attempts may be performed with potential orthogonal cover codes on a known basic sequence.

The channel component 318 estimates a channel between the UE 102 and a source UE based on the reference signal with the unknown sequence. In one embodiment, the discovery information component 314 receives a DM-RS having an unknown randomly selected DM-RS sequence. From the perspective of a receiving UE, the blind sequence detection component 316 performs blind detection of the DM-RS sequence, and the channel component 318 performs estimation and synchronization to ensure an appropriate channel estimation, timing, and frequency offset compensation for the source UE.

Figure 4:
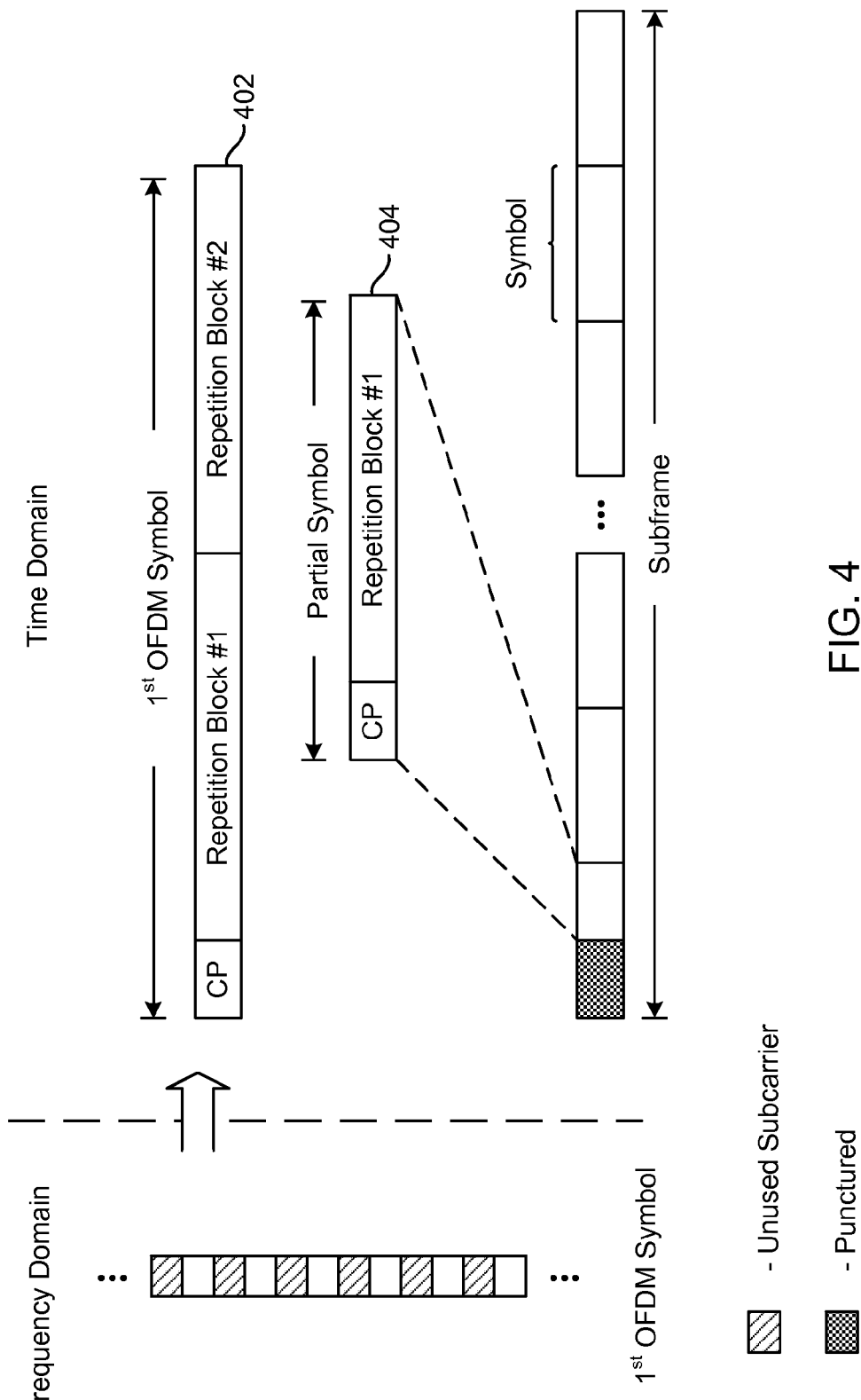
FIGS. 4 and 5 are schematic block diagrams illustrating guard period generation consistent with embodiments disclosed herein.
Figure 5:
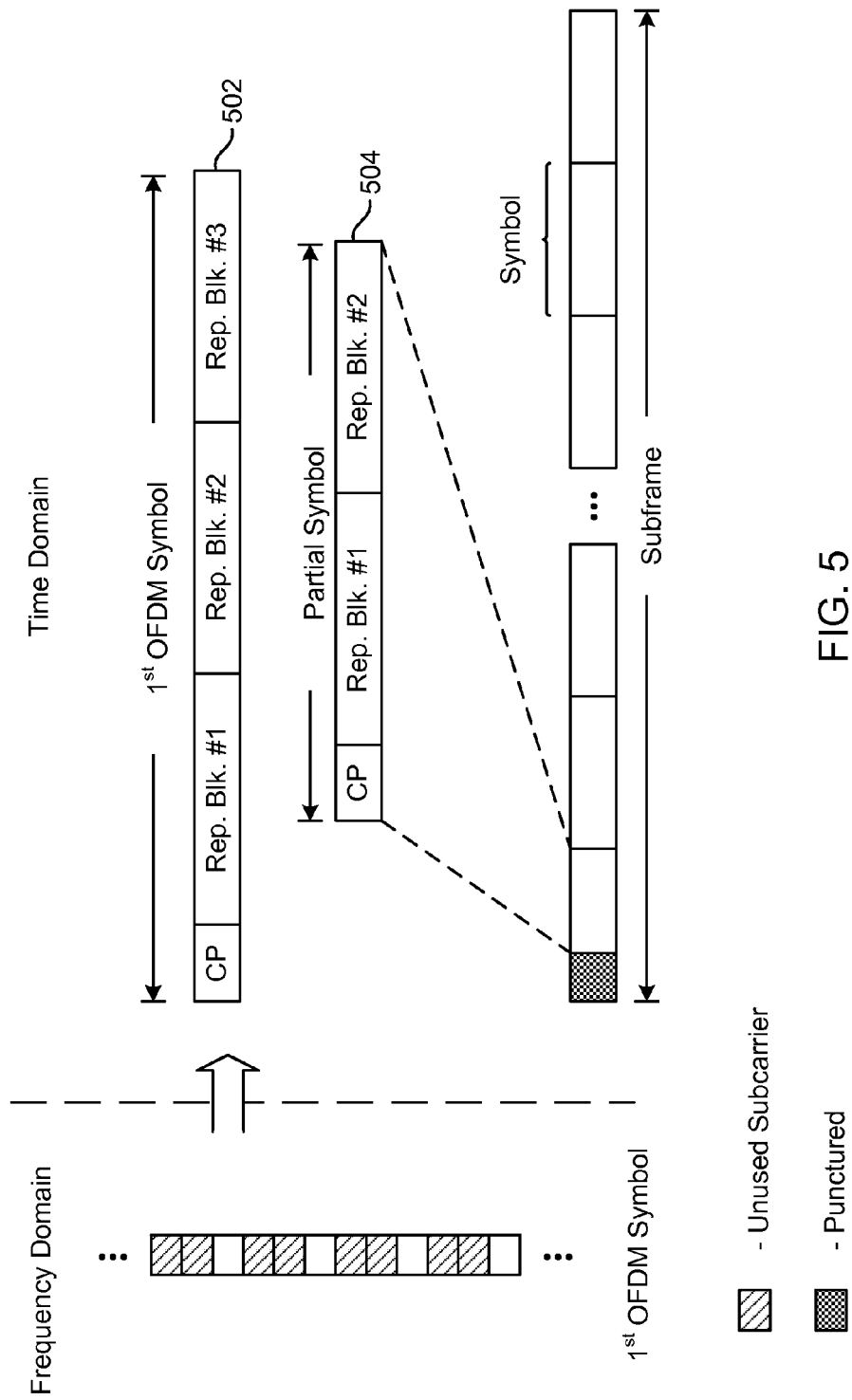

FIGS. 4 and 5 illustrate example guard periods for a first symbol of an OFDM symbol. Specifically, FIGS. 4 and 5 illustrate guard period generation based on IFDMA signal structure, which may be performed by the guard period component 310. FIG. 4 illustrates puncturing of a first half of the first symbol. Specifically, the first symbol uses an IFDMA signal structure with an RPF of 2. In this case, data or reference symbols can be mapped into every even subcarrier in the frequency domain, creating a comb-like spectrum. As illustrated, this design pattern results in two repeated blocks in the first OFDM symbol 402 in the time domain. By puncturing the second repetition block and subsequently shifting the cyclic prefix (CP) and first repetition block, as shown in the punctured first symbol 404, an approximately 33 µs guard period in the first OFDM symbol can be generated. Note that this proposed guard period generation can be applied for both reference signals and data symbols.

In the case where a DM-RS is transmitted during the first symbol, the discovery DM-RS sequence may reuse the existing Zadoff-Chu (ZC) sequence. In one embodiment, a different sequence can also be considered for the discovery DM-RS sequence design. An example of preamble generation for the first OFDM symbol is described as follows. The reference signal sequence or modulated symbols in the first symbol may be multiplied with an amplitude scaling factor $\beta_{D2D}$ in order to conform to a transmit power $P_{D2D}$ and may be mapped in sequence starting with $r_{D2D}(0)$ to resource elements (k, 0) according to:

$$a_{2k'+k_0,0} = \begin{cases} \beta_{D2D} r_{D2D}(k'), & k' = 0, 1, K, M_{D2D}^{RS}/2 - 1 \\ 0, & \text{otherwise} \end{cases} \quad \text{Eq. (1)}$$

where $k_0$ is the frequency-domain starting position of the discovery resource block, $M_{D2D}^{RS}$ is the length of the reference signal sequence, and $M_{D2D}^{RS} = mN_{D2D}^{RB}$. In FIG. 4, $N_{D2D}^{RB} = 12$ and m is within the range $1 \leq m \leq N_{D2D}^{RB,UL}$. The D2D discovery reference signal sequence in the first OFDM symbol $r_{D2D}(n) = r_{u,v}^{(\alpha_{D2D})}(n)$ may be used as defined by 3GPP TS 36.211, Section 5.5.1, where u is the sequence-group number defined in 3GPP TS 36.211, Section 5.5.1.3, and v is the base sequence number defined in 3GPP TS 36.21, Section 5.5.1.4. The cyclic shift $\alpha_{D2D}$ of the discovery reference signal in the first OFDM symbol is given as:

$$\alpha_{D2D} = 2\pi \frac{n_{D2D}^{cs}}{N_{D2D}^{RS}} \quad \text{(Eq. 2)}$$

where $N_{D2D}^{RS}$ is the number of cyclic shifts for D2D discovery and may have the value 6, 8, or 12. $n_{D2D}^{cs} = \{0, 1, 2, L, N_{D2D}^{RS}-1\}$ is the cyclic shift index. For open D2D discovery, ProSe enabled UEs may randomly select the cyclic shift index when transmitting the discovery packet, as discussed above. For restricted ProSe discovery, $n_{D2D}^{cs}$ may be configured by higher-layer signaling, such as by an application layer or radio resource control (RRC) layer.

Note that when discovery packet transmission occupies one resource block (i.e., $M_{D2D}^{RS} = 12$), a new base sequence may be used. In general, the new base sequence will have constant modulus in the frequency domain, low peak-to-average power ratio (PAPR), low memory/complexity requirements, and good cross-correlation properties. An example of a base sequence with six phase values which may be used is given below.

For $M_{SC}^{RS} = N_{SC}^{RB}/2$, a base sequence is given by:

$$\bar{r}_{u,v}(n) = e^{j\phi(n)\pi/4} \quad \text{(Eq. 3)}$$

where $0 \leq n \leq M_{SC}^{RB}-1$ and $\phi(n)$ can be given as:

$$\phi(0), \ldots, \phi(5) = \{-1, -1, 3, -3, 3, -3\}. \quad \text{(Eq. 4)}$$

In FIG. 5, an IFDMA signal structure with an RPF of 3 is illustrated. In the frequency domain, either data or reference symbols can be mapped onto every third subcarrier. As illustrated, this would create three repeated blocks in the first OFDM symbol 502 in the time domain. By puncturing the repetition block #3 and shifting the CP and first two repetition blocks, as shown in the punctured first symbol 504, an approximately 22 µs guard period can be generated.

An example of preamble generation for the first OFDM symbol based on RPF 3 is described as follows. The reference signal sequence or modulated symbols may be multiplied with the amplitude scaling factor $\beta_{D2D}$ in order to conform to a transmit power $P_{D2D}$ and may be mapped in sequence starting with $r_{D2D}(0)$ to resource elements (k, 0) according to:

$$a_{3k'+k_0,0} = \begin{cases} \beta_{D2D} r_{D2D}(k'), & k' = 0, 1, K, M_{D2D}^{RS}/3 - 1 \\ 0, & \text{otherwise} \end{cases} \quad \text{(Eq. 5)}$$

where $k_0$ is the frequency-domain starting position of the discovery resource block, $M_{D2D}^{RS}$ is the length of the reference signal sequence, and $M_{D2D}^{RS} = mN_{D2D}^{RB}$. In FIG. 5, $N_{D2D}^{RB} = 12$ and m is within the range $1 \leq m \leq N_{D2D}^{RB,UL}$.

It is worth mentioning that the structures of both FIG. 4 and FIG. 5 can be easily extended to support public safety-specific use cases in partial and outside-network coverage scenarios. For instance, the last OFDM symbol may be punctured in the same way as the first OFDM symbol in order to accommodate an even larger synchronization error.

Turning now to FIGS. 6-13, physical layer structures for D2D discovery signals are proposed. For D2D discovery, a certain number of primary resource block (PRB) pairs (i.e., subframes) mapped in a certain way (frequency first, time first, or following a mixed mapping) to time-frequency resources can be used to carry the discovery packet. Let us denote $N_f \times N_t$ as the time-frequency resources, where $N_f$ is the number of resource blocks in the frequency domain and $N_t$ is the number of slots or subframes in the time domain. For instance, for a 2×1 frequency domain resource allocation scheme, each discovery packet transmission occupies 24 subcarriers within one subframe. For a 1×2 time-domain resource allocation scheme, each discovery packet transmission spans two subframes and occupies 12 subcarriers in each subframe. Note that when the discovery packet transmission spans more than one subframe, guard periods in the first OFDM symbol of the second and subsequent subframes may not be needed, which would provide a lower coding rate and thereby better link level discovery performance. FIGS.

6-13 cover four generally different physical layer structures for D2D discovery signal designs.

Figure 6:
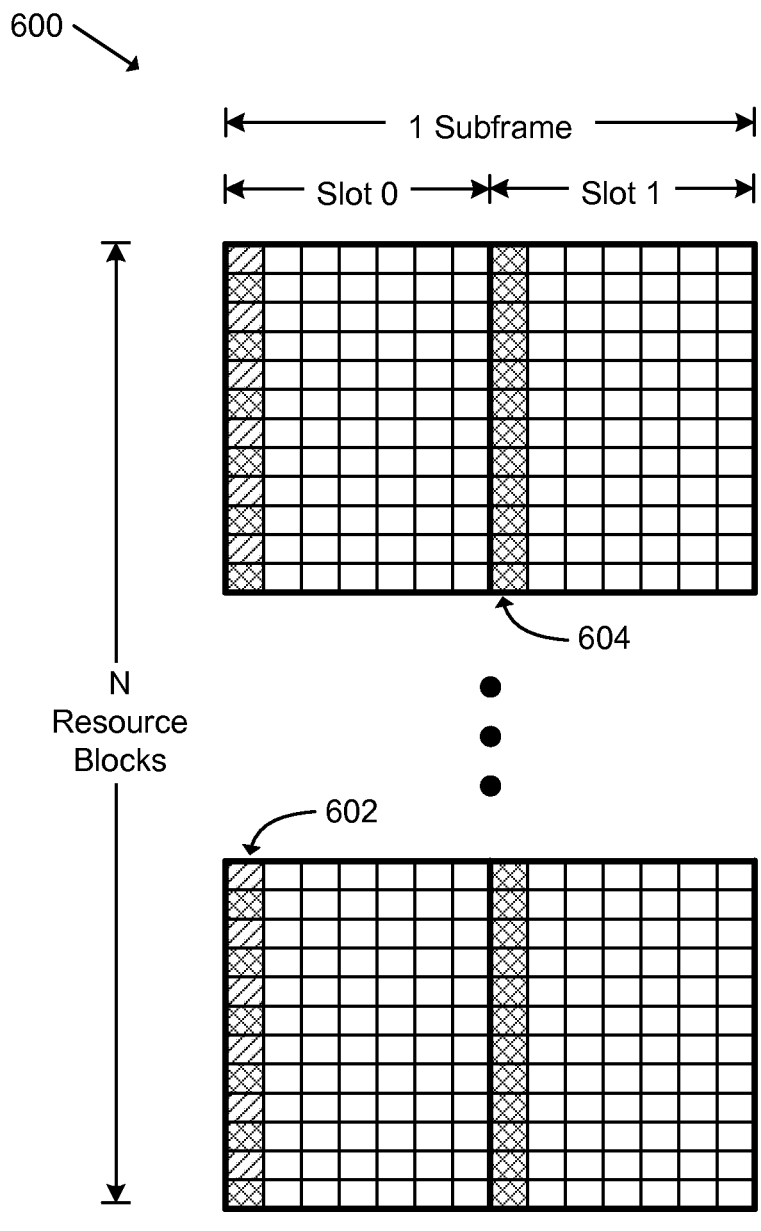
FIGS. 6-13 are schematic diagrams illustrating resource structures and reference signal positions consistent with embodiments disclosed herein.
Figure 7:
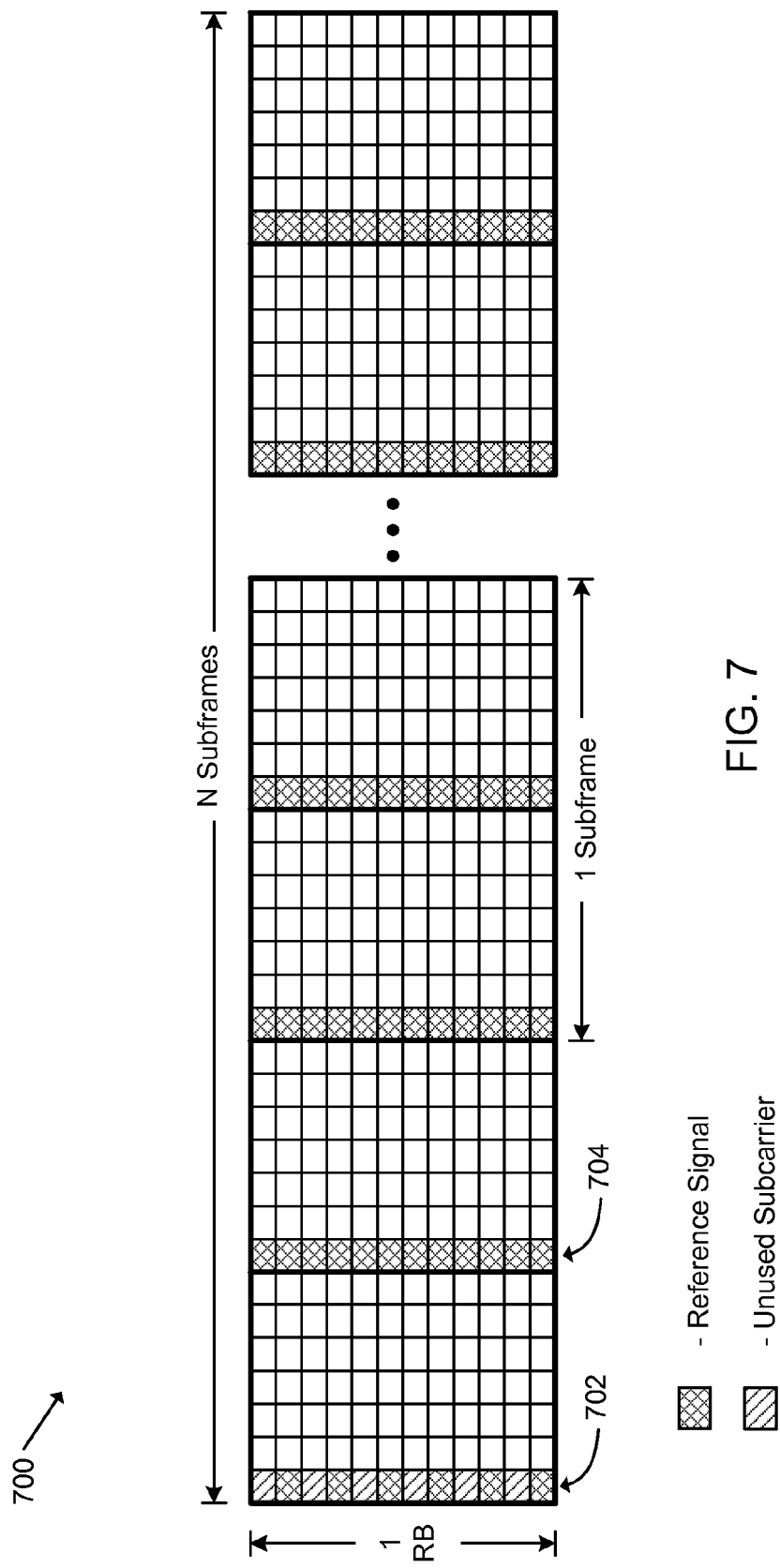

FIGS. 6 and 7 illustrate a first example option for D2D discovery signal design. In the first example option, a DM-RS is located in the first OFDM symbol for each slot (i.e., resource block), which can be constructed based on the UL DM-RS for physical uplink shared channel (PUSCH) transmission. More specifically, for restricted ProSe discovery, the discovery DM-RS can be generated according to 3GPP TS 36.211, Section 5.5.2.1. For open ProSe discovery, the discovery DM-RS can be generated as follows.

The discovery demodulation reference signal sequence $r_{D2D}^{(\lambda)}( )$ associated with layer $\lambda \in \{0, 1, \ldots, v-1\}$ is defined by:

$$r_{D2D}^{(\lambda)}(mM_{SC}^{RS}+n)=r_{u,v}^{(\alpha_\lambda)}(n) \quad \text{(Eq. 6)}$$

where m=0 and n=0, ..., $M_{SC}^{RS}$-1. 3GPP TS 36.211, Section 5.5.1, defines the sequence $r_{u,v}^{(\alpha_\lambda)}(0)$, ..., $r_{u,v}^{(\alpha_\lambda)}(M_{SC}^{RS}-1)$. The cyclic shift $\alpha_\lambda$ in a slot $n_S$ is given as $\alpha_\lambda=2\pi n_{CS,\lambda}/12$. $n_{CS,\lambda}$ can be randomly chosen from a set or a subset of {0, 1, 2, ..., 11}.

As mentioned in the proposed guard period generation procedure, the length of a DM-RS sequence would be reduced by half (in the case of RPF=2) or ⅔ (in the case of RPF=3) for the first OFDM symbol. Furthermore, data symbols may be generated by utilizing either single carrier FDMA (SC-FDMA) or OFDMA transmission schemes.

FIGS. 6 and 7 illustrate discovery signal structures 600 and 700, according to the first example option above, with $N_f \times 1$ and $1 \times N_f$ time-frequency resource mapping, respectively. A guard period in the first OFDM symbols 602 and 702 is shown based on the guard period generation with half of the subcarriers allocated for the reference signal, as discussed above with an RPF of 2. The first OFDM symbols 604 and 704 of the second slot (slot 1) also include a reference signal, but are not punctured. Note that in the examples of FIGS. 6-13, a guard period generation procedure with half of the subcarriers allocated for reference or data symbols is assumed unless otherwise stated. In addition, although the examples shown are based on the normal CP, D2D discovery signal designs can be easily generated for the extended CP case.

Figure 8:
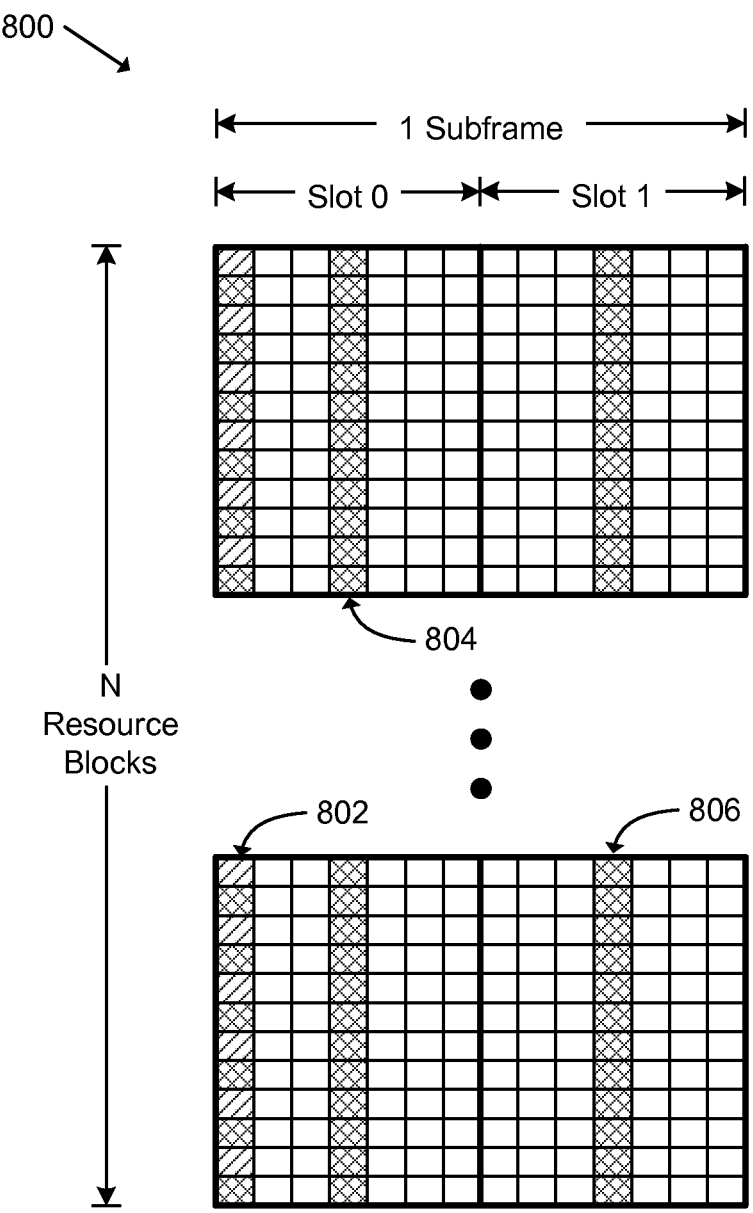
Figure 9:
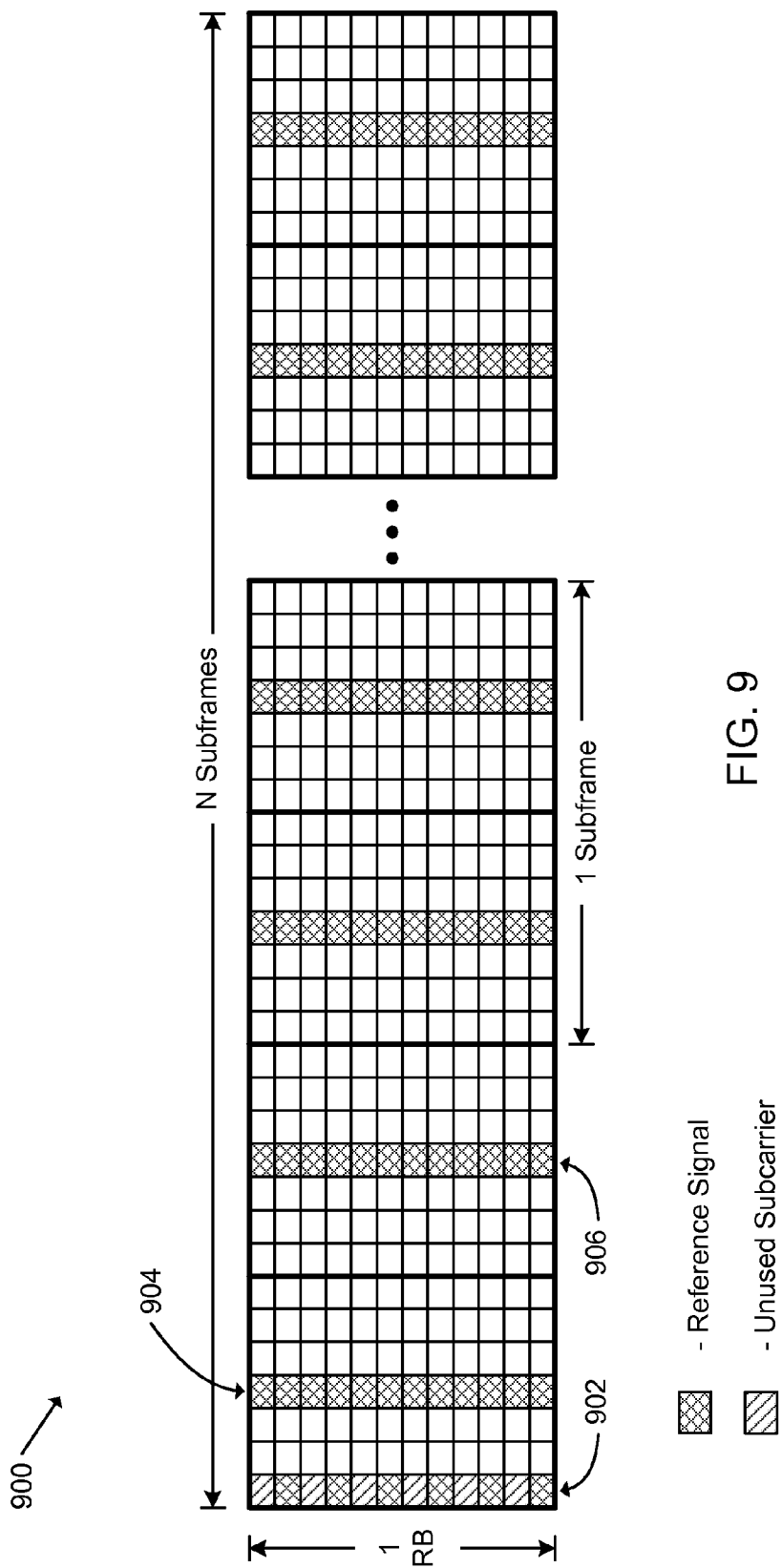

Turning to FIGS. 8 and 9, a second example option for D2D discovery signal design is discussed. In the second example option, the discovery DM-RS occupies the centered OFDM symbol for each slot as well as the first OFDM symbol of the first slot (slot 0). The discovery DM-RS allocated for the centered OFDM symbol can be generated according to 3GPP TS 36.211, Section 5.5.2.1. For open ProSe discovery, the discovery DM-RS can be generated as follows.

The discovery demodulation reference signal sequence $r_{D2D}^{(\lambda)}( )$ associated with layer $\lambda \in \{0, 1, \ldots, v-1\}$ is defined by:

$$r_{D2D}^{(\lambda)}(mM_{SC}^{RS}+n)=r_{u,v}^{(\alpha_\lambda)(n)} \quad \text{(Eq. 7)}$$

where m=0, 1 and n=0, ..., $M_{SC}^{RS}$-1. 3GPP TS 36.211, Section 5.5.1, defines the sequence $r_{u,v}^{(\alpha_\lambda)}(0)$, ..., $r_{u,v}^{(\alpha_\lambda)}(M_{SC}^{RS}-1)$. The cyclic shift $\alpha_\lambda$ in a slot $n_S$ is given as $\alpha_\lambda=2\pi n_{CS,\lambda}/12$. $n_{CS,\lambda}$ can be randomly chosen from a set or a subset of {0, 1, 2, ..., 11}.

As mentioned in the proposed guard period generation procedure, the length of a DM-RS sequence would be reduced by half (in the case of RPF=2) or two-thirds (in the case of RPF=3) for the first OFDM symbol. Furthermore, data symbols may be generated by utilizing either SC-FDMA or OFDMA transmission schemes.

FIGS. 8 and 9 illustrate discovery signal structures 800 and 900, according to the second example option above, with $N_f \times 1$ and $1 \times N_f$ time-frequency resource mapping, respectively. A guard period in the first OFDM symbols 802 and 902 is shown based on the guard period generation with half of the subcarriers allocated for the reference signal, as discussed above with an RPF of 2. The centered symbols 804, 904 and 806, 906 are shown with reference signals, but are not punctured.

Figure 10:
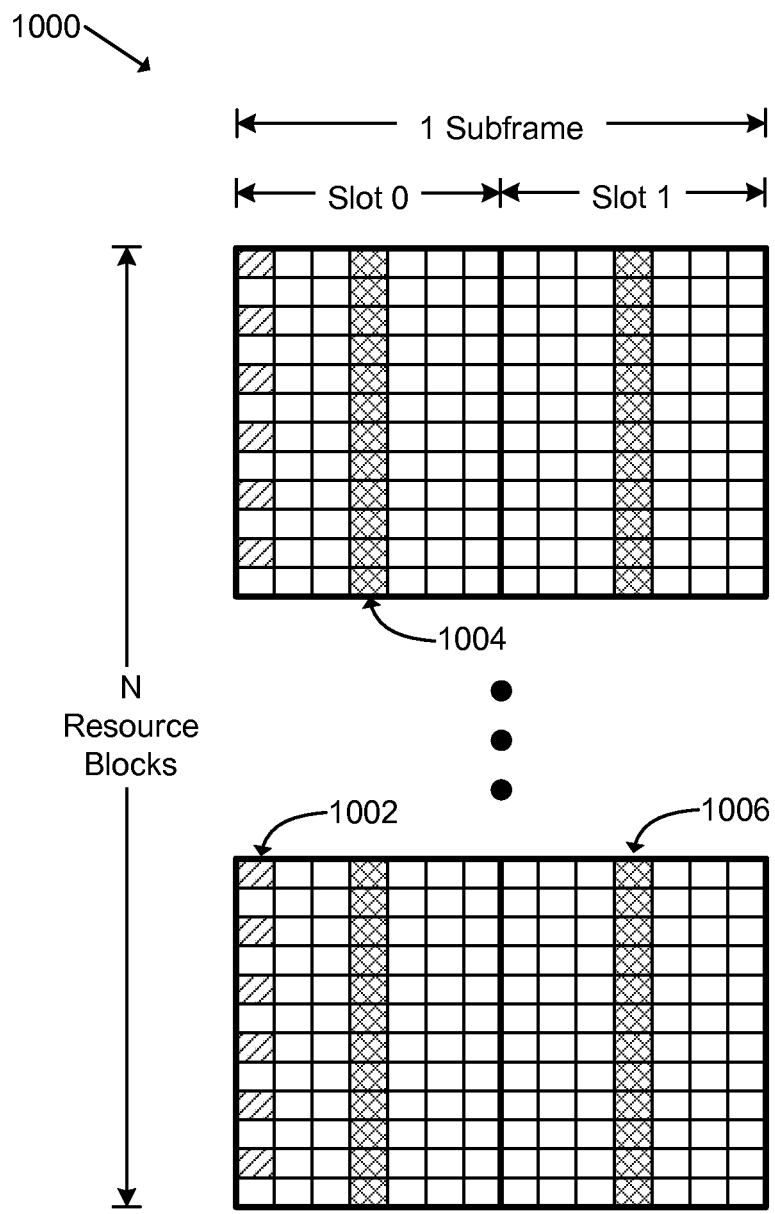
Figure 11:
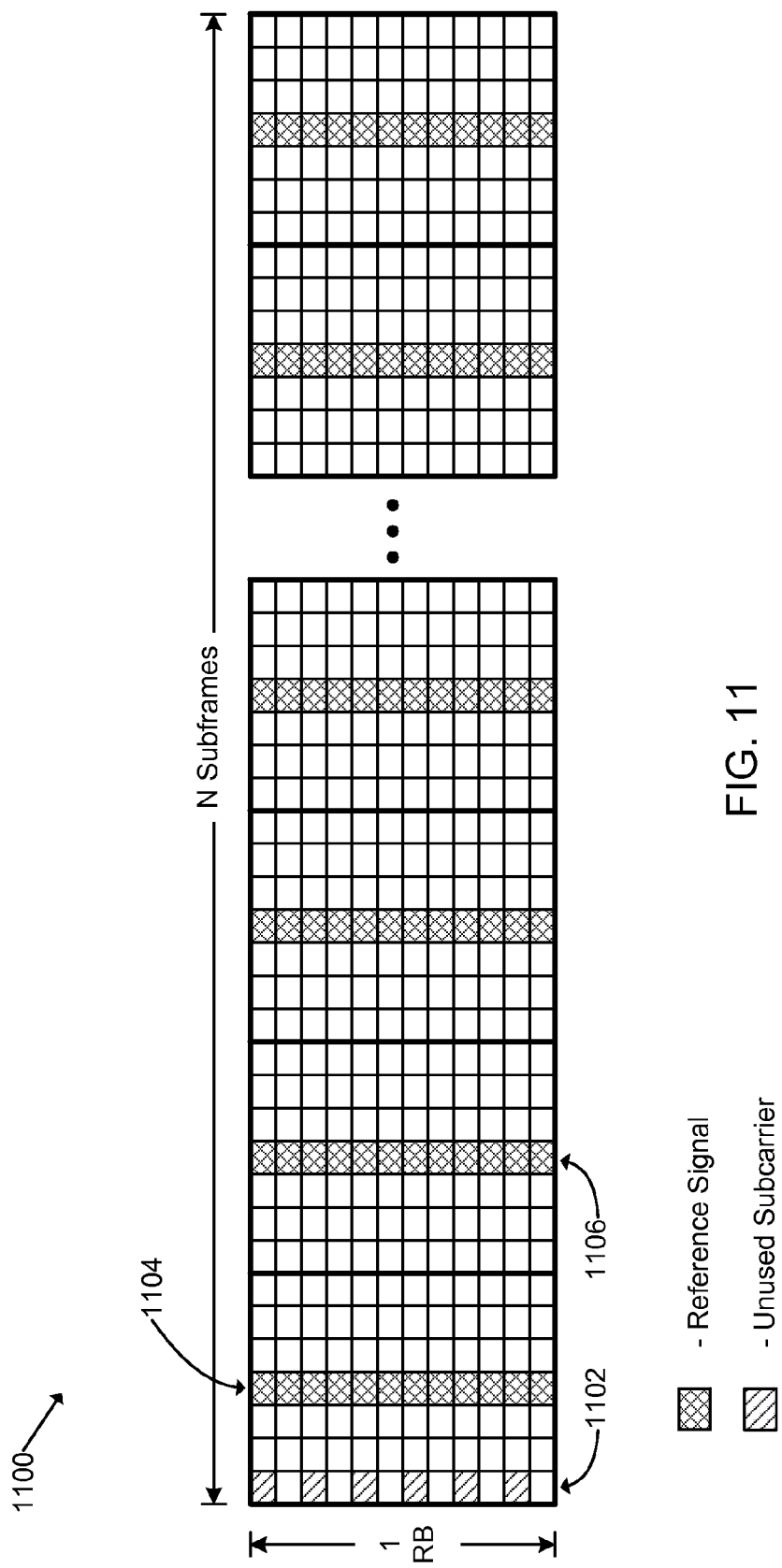

Turning to FIGS. 10 and 11, discovery signal structures 1000 and 1100 represent a third example option for D2D discovery signal design. In the third example option, the discovery DM-RS occupies the centered OFDM symbols 1004, 1104 and 1006, 1106 for each slot. The discovery DM-RS generation for the centered OFDM symbol is the same as discussed with reference to FIGS. 8 and 9. In addition, for the first OFDM symbols 1002 and 1102, data signals are mapped into every even subcarrier to generate guard periods within the first symbol. Furthermore, the first data symbol is generated based on an OFDMA transmission scheme. FIGS. 10 and 11 illustrate the third example option discovery signal design with $N_f \times 1$ and $1 \times N_f$ time-frequency resource mapping, respectively.

Figure 12:
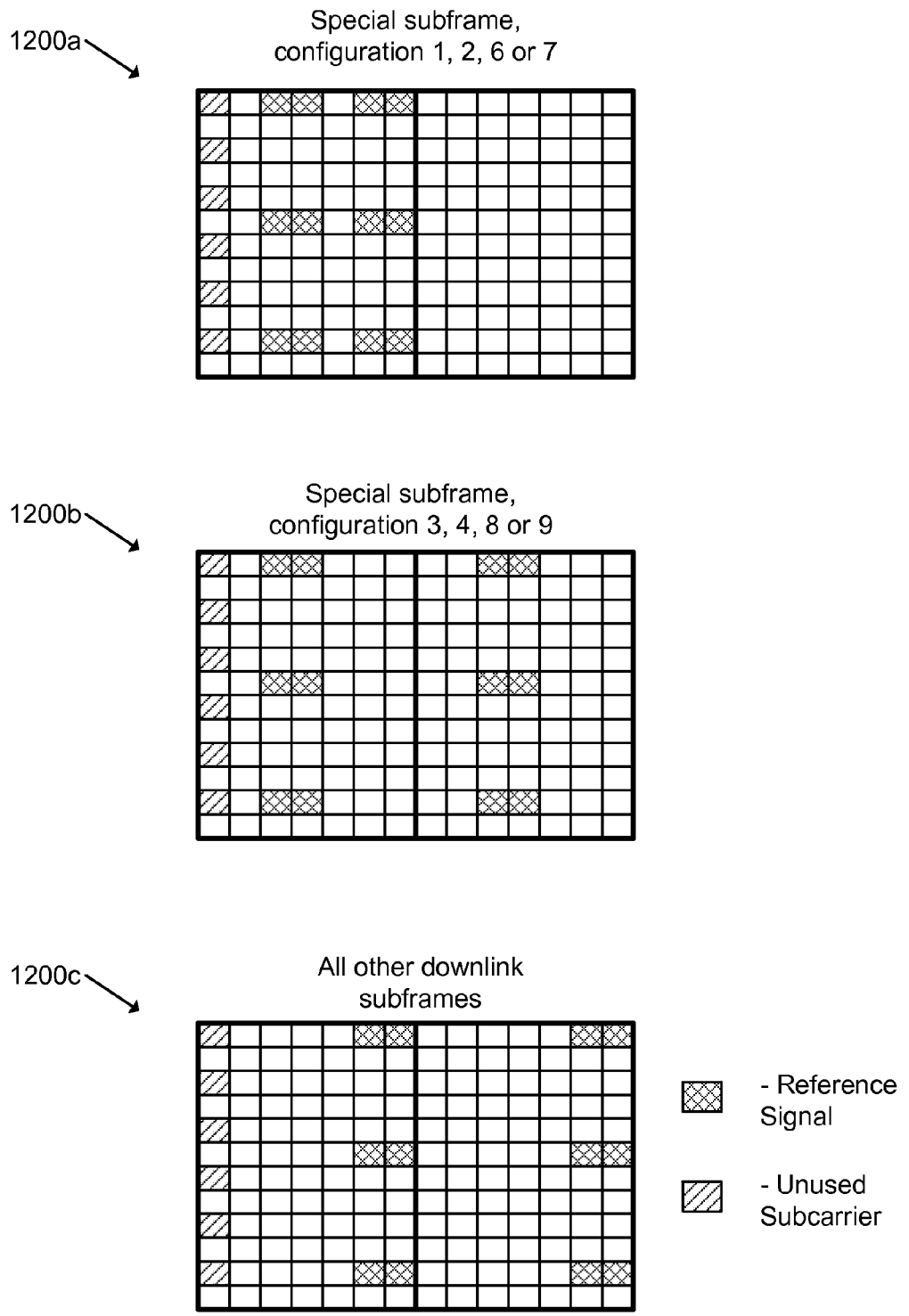
Figure 13:
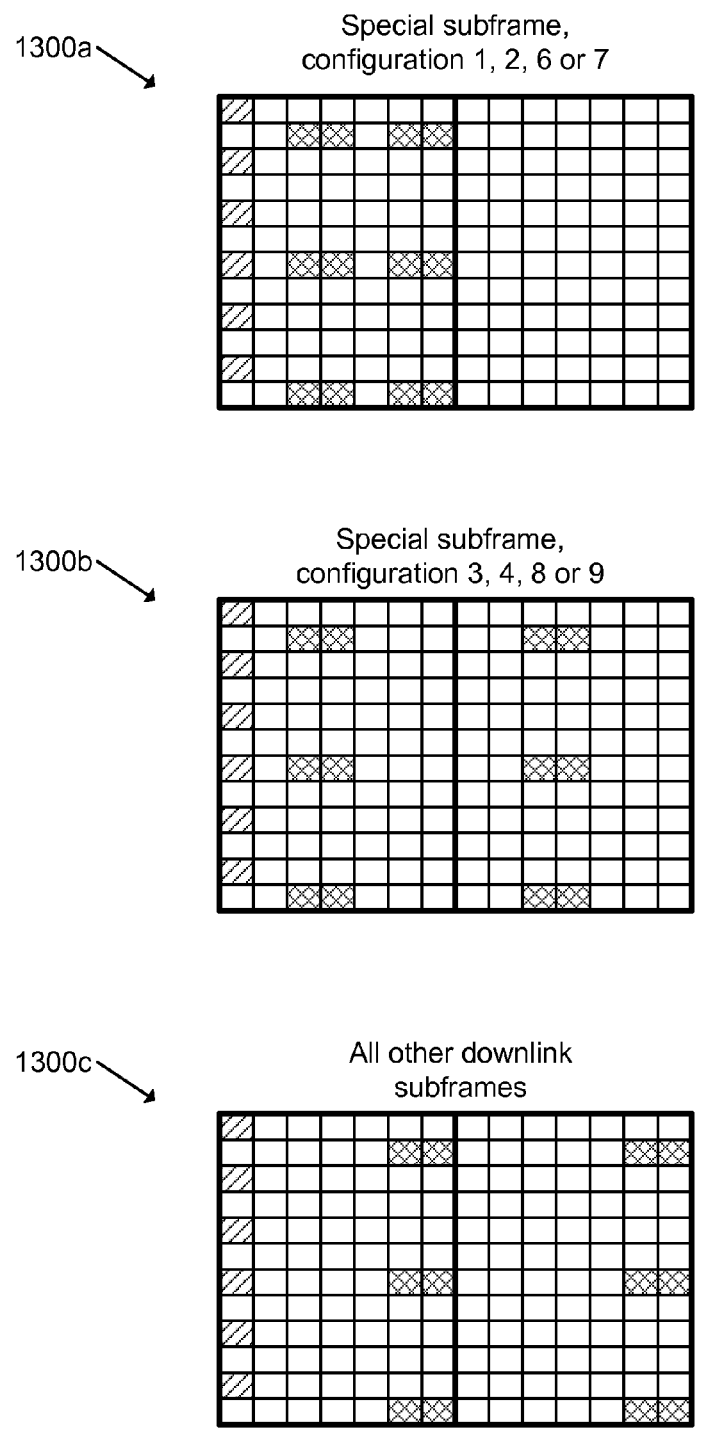

Turning to FIGS. 12 and 13, a fourth example option for D2D discovery signal design is discussed. For the fourth example option, the position of the discovery DM-RS follows a similar principle to DM-RS in DL subframes for transmission modes (TM) 8 and 9 physical DL shared channel (PDSCH) transmission. More specifically, for restricted D2D discovery, the discovery DM-RS can be generated according to 3GPP TS 36.211, Section 6.10.3. For open D2D discovery, the discovery DM-RS can be generated as follows. Note that in this case, ProSe enabled UE can randomly choose one antenna port for discovery signal transmission.

For any of the antenna ports $p \in \{7, 8, \ldots, 10\}$, the reference-signal sequence r (m) is defined by $$r(m) = \frac{1}{\sqrt{2}}(1-2c(2m)) + j\frac{1}{\sqrt{2}}(1-2c(2m+1)) \quad \text{(Eq. 8)}$$

where $m = \begin{cases} 0, 1, \ldots, 12N_{RB}^{PDSCH}-1 & \text{normal cyclic prefix} \\ 0, 1, \ldots, 12N_{RB}^{PDSCH}-1 & \text{extended cyclic prefix} \end{cases}$ The pseudo-random sequence c(i) is defined in 3GPP TS 36.211, Section 7.2. The pseudo-random sequence generator will be initialized at the start of each subframe with:

$$c_{init} = \left(\left\lfloor \frac{n_s}{2}\right\rfloor+1\right)\times 2^{16} \quad \text{Eq. (9)}$$

FIGS. 12 and 13 illustrate the fourth example option for discovery signal design for the first subframe. FIG. 12 illustrates discovery signal structures 1200a, 1200b, and 1200c for antenna ports 7 and 8. FIG. 13 illustrates discovery signal structures 1300a, 1300b, and 1300c for antenna ports 9 and 10. Note that for second and subsequent subframes in $1 \times N_f$ time-frequency resource mapping, a guard period in the first OFDM symbol of the second and subsequent subframes is not needed; hence the mapping rule can follow the same principle as defined in 3GPP TS 36.21, Section 6.10.3. Similar to the third example option, the data symbol is constructed according to OFDMA technique, and the first OFDM symbol is punctured, in one embodiment, to ensure a proper guard period.

Figure 14:
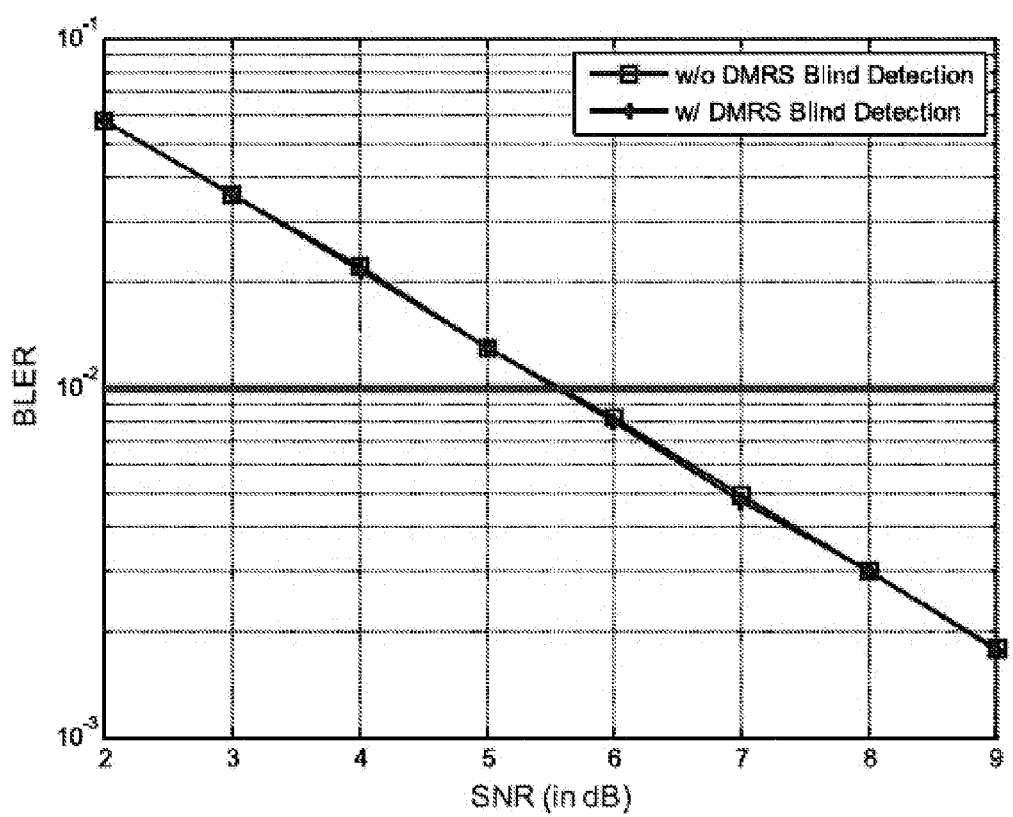
FIGS. 14 and 15 are graphs illustrating discovery performance with reference signal blind detection consistent with embodiments disclosed herein.
Figure 15:
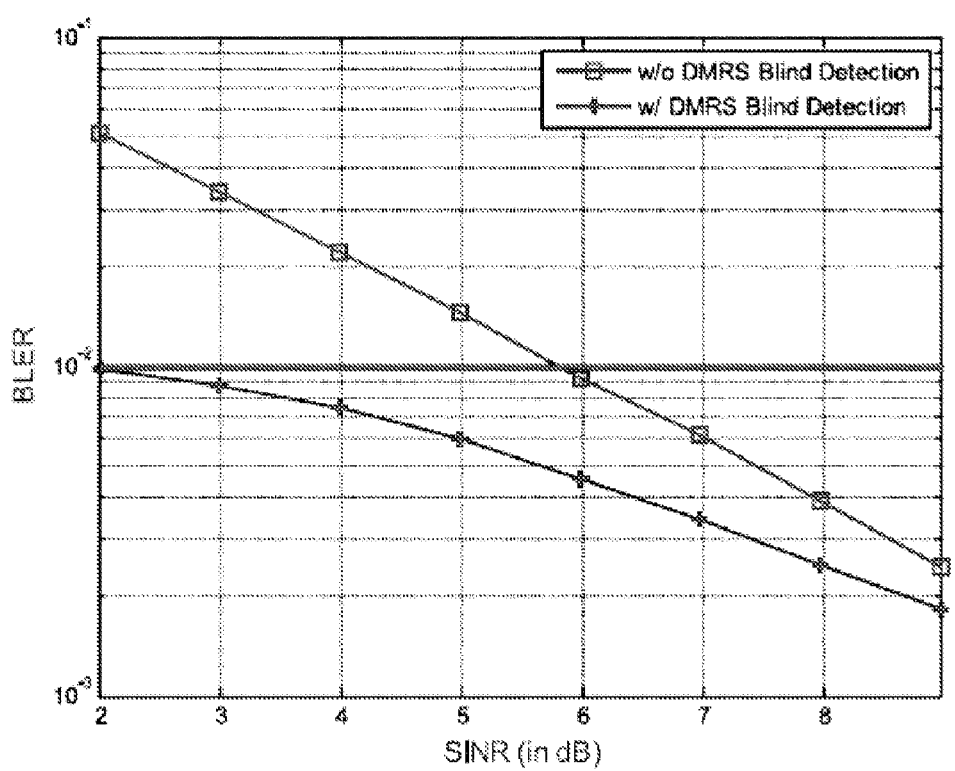

FIGS. 14 and 15 illustrate discovery performance for blind detection. For open discovery, a ProSe enabled device may randomly select the DM-RS sequences when transmitting the discovery packet. As discussed above, from the reception UE perspective, discovering UEs need to perform blind detection of a DM-RS sequence to ensure the appropriate channel estimation and timing and frequency offset compensation. In particular, if a UL DM-RS is selected as discovery DM-RS, a DM-RS blind detection algorithm (implemented by the blind sequence detection component 316) finds the candidate sequence with maximum correlation energy to determine the cyclic shift of the DM-RS sequence.

FIG. 14 illustrates the discovery performance with DM-RS blind detection in the case without co-channel interference for a D2D discovery structure according to the second example option discussed above. From the plots, it can be seen that the performance degradation is negligible with DM-RS blind detection. This is primarily due to the fact that DM-RS miss detection probability is well below $10^{-3}$ block error rate (BLER) in the operating signal-to-interference ratio (SINR) range for discovery, such as approximately 4 dB.

FIG. 15 illustrates the discovery performance with DM-RS blind detection under co-channel interference for a D2D discovery structure according to the second example option discussed above. In the simulations, a fixed 30 dB SNR is assumed, and a DM-RS cyclic shift of the interference UE is distinct from that of target UE. Based on the simulation results, it is interesting to note that DM-RS blind detection can significantly improve the overall discovery performance by exploiting the inherent selection diversity, under the assumption that interference UE transmits the valid packet with distinct cyclic shift, and interference signal power is in a close range of target signal power.

FIG. 16 is a schematic flow chart diagram illustrating a method 1600 for D2D discovery. In one embodiment, the method 1600 is performed by a mobile device, such as the UE 102 of FIG. 3. In one embodiment, the UE 102 may perform the method 1600 prior to establishing a D2D session with one or more other UEs.

The method 1600 begins and a reference signal component 308 randomly selects 1602 a sequence for a reference signal. The reference signal component 308 may select 1602 the sequence by selecting an index for a cyclic shift or an orthogonal cover code for a predetermined base sequence. The reference signal component 308 may select 1602 the signal using a random number generator. In one embodiment, the reference signal component 308 selects 1602 the sequence for a reference signal for transmission in an open device-to-device discovery packet. The reference signal component 308 selects 1602 the sequence for a DM-RS or SRS.

A guard period component 310 determines 1604 a guard period for the discovery transmission. For example, the guard period component 310 may determine 1604 a first symbol signal for transmission during a partially punctured first symbol of the device-to-device discovery packet. In one embodiment, the guard period component 310 determines 1604 the guard period by generating a punctured first symbol. The guard period component 310 may generate a first symbol similar to the first symbols illustrated in FIGS. 5 and 6.

A transmission component 312 transmits 1606 a D2D discovery packet. In one embodiment, the transmission component 312 may transmit 606 a D2D discovery packet that includes a guard period determined 1604 by the guard period component 310. In one embodiment, the transmission component 312 may transmit 1606 a D2D discovery packet that includes a reference signal generated based on the sequence selected 1602 by the reference signal component 308. In one embodiment, the transmission component 312 transmits 1606 a D2D discovery packet that includes a punctured first symbol. The punctured first symbol may include a reference signal or may include data.

FIG. 17 is a schematic flow chart diagram illustrating another method 1700 for D2D discovery. In one embodiment, the method 1700 is performed by a mobile device, such as the UE 102 of FIG. 3. In one embodiment, the UE 102 may perform the method 1700 prior to establishing a D2D session with one or more other UEs.

The method 1700 begins and a receiver component 304 receives 1702 a message from a base station allocating licensed wireless resources for D2D discovery. In one embodiment, the receiver component 304 receives 1702 the message from an eNodeB 110 allocating one or more resource blocks for D2D discovery. In one embodiment, the allocated wireless resources include licensed resources for a cellular network.

A reference signal component 308 determines 1704 a random sequence for a reference signal for the licensed wireless resources. A transmission component 312 transmits 1706 D2D discovery information during the allocated licensed resources and also transmits 1708 a reference signal based on the random sequence. For example, the transmission component 312 may transmit a reference signal and discovery information according to any of the embodiments of FIGS. 4-13. The method 1700 may also include establishing a D2D session with one or more proximal UEs.

Figures 18, 19:
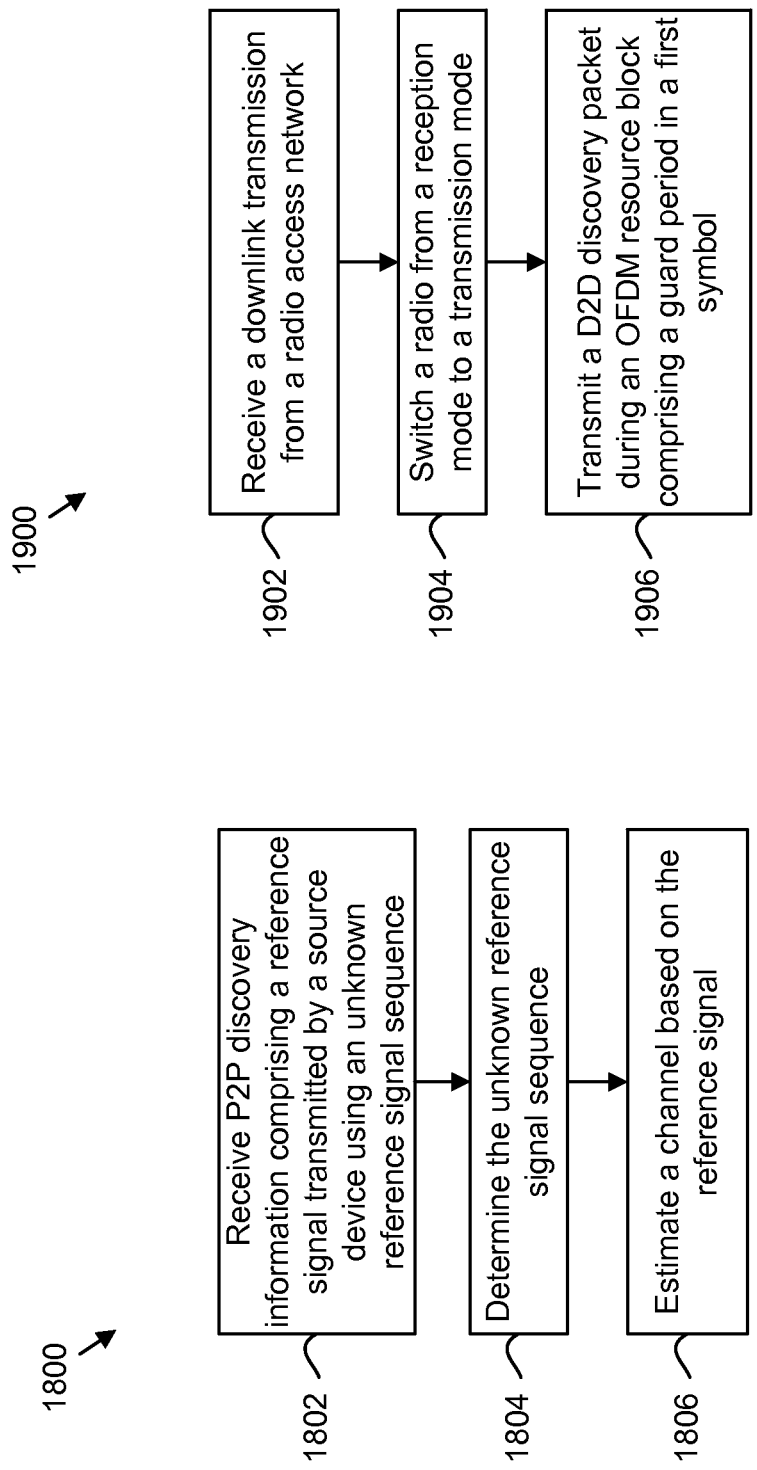

FIG. 18 is a schematic flow chart diagram illustrating another method 1800 for D2D discovery. In one embodiment, the method 1800 is performed by a mobile device, such as the UE 102 of FIG. 3. In one embodiment, the UE 102 may perform the method 1800 prior to establishing a D2D session with one or more other UEs.

The method 1800 begins and a discovery information component 314 receives 1802 open P2P discovery information. The discovery information includes a reference signal transmitted by a source device using an unknown reference signal sequence. For example, the source device may have generated the reference signal based on a random cyclic shift index or orthogonal cover code index.

The blind sequence detection component 316 determines 1804 the unknown reference signal sequence. For example, the blind sequence detection component 316 may determine 1804 the unknown sequence by identifying a candidate sequence with a maximum correlation energy to the actual received reference signal. The channel component 318 estimates 1806 the channel between the source device and the UE 102 based on the reference signal. In one embodiment, the method 1800 includes transmitting a request to establish a D2D session with the source device.

FIG. 19 is a schematic flow chart diagram illustrating yet another method 1900 for D2D discovery. In one embodiment, the method 1900 is performed by a mobile device, such as the UE 102 of FIG. 3. In one embodiment, the UE 102 may perform the method 1900 prior to establishing a D2D session with one or more other UEs.

The method 1900 begins and a receiver component 304 receives 1902, with a radio in a reception mode, a DL transmission from a radio access network. For example, the receiver component 304 may receive a DL transmission from an eNodeB 110.

A communication mode component 302 switches 1904 the radio of the UE 102 from the reception mode to a transmission mode. In one embodiment, the communication mode component 302 switches 1904 the communication mode in preparation for a resource allocated for D2D discovery. A transmission component 312 transmits 1906 a D2D discovery packet during an OFDM resource block. The resource block may include a guard period in a first symbol of the OFDM resource block. In one embodiment, the guard period provides enough time for the radio to ramp up power and transmit the discovery packet.

Figure 20:
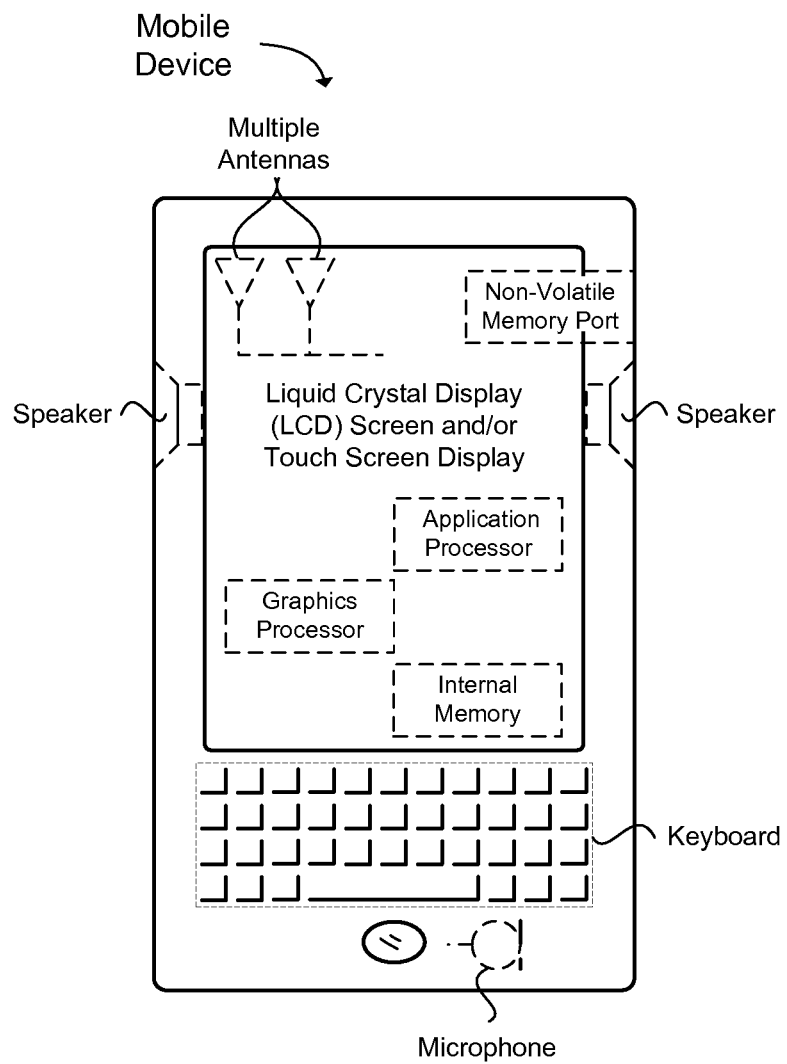
FIG. 20 is a schematic diagram of a mobile device consistent with embodiments disclosed herein.

FIG. 20 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 20 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen. The screen and/or an input device, such as the keyboard or touch screen, may provide a user input interface for a user to interact with the mobile device.

EXAMPLES

The following examples pertain to further embodiments.

Example 1 is a wireless communication device configured to receive a message from a base station allocating licensed wireless resources for D2D discovery. The wireless communication device is configured to determine a random sequence for a reference signal for the licensed wireless resources. The reference signal comprises an LTE PUSCH DM-RS. The wireless communication device is configured to transmit D2D discovery information during the allocated licensed resources. The wireless communication device is configured to transmit a reference signal based on the random sequence.

In Example 2, the reference signal of Example 1 is transmitted during a fourth symbol and tenth symbol of each resource block of the allocated licensed wireless resource in the normal cyclic prefix case and during a third symbol and ninth symbol of each resource block in the extended cyclic prefix case.

In Example 3, determining the random sequence in any of Examples 1-2 optionally includes randomly selecting an orthogonal cover code for a base sequence.

In Example 4, determining the random sequence in any of Examples 1-3 optionally includes selecting the random sequence comprises selecting a cyclic shift for a base sequence.

In Example 5, transmitting the D2D discovery information of any of Examples 1-4 optionally includes transmitting an open discovery packet.

Example 6 is a UE that includes a radio configured to transmit and receive signals in a licensed wireless spectrum as well as a receiver component, a communication component, and a transmission component. The receiver component is configured to receive, with the radio in a reception mode, a downlink transmission from a radio access network. The communication mode component configured to switch the radio from the reception mode to a transmission mode. The transmission component is configured to transmit a D2D discovery packet during an OFDM resource block. Transmitting the D2D discovery packet includes transmitting a first symbol of the OFDM resource block having a guard period.

In Example 7, transmitting the first symbol including a guard period in Example 6 optionally transmitting the first symbol with an unused first portion of the first symbol and a used portion of the first symbol, wherein the first portion precedes the second portion in time.

In Example 8, the first portion of the first symbol of Example 7 optionally has a length of about 20 milliseconds or more.

In Example 9, the first portion of the first symbol of any of Examples 7-8 optionally includes about one-third of the first symbol.

In Example 10, the first portion of the first symbol of any of Examples 7-8 optionally includes comprises about one-half of the first symbol.

Example 11 is a device for open P2P discovery in a 3GPP LTE protocol that includes a discovery information component, a blind sequence detection component, and a channel component. The discovery information component is configured to receive open P2P discovery information. The discovery information includes a reference signal transmitted by a source wireless communication device using an unknown reference signal sequence. The blind sequence detection component is configured to determine the unknown reference signal sequence. The channel component is configured to estimate a channel between the device and the source wireless communication device based on the reference signal.

In Example 12, the device of Example 11 optionally further includes a scheduling component configured to receive a message from a 3GPP LTE network infrastructure allocating licensed wireless resources for P2P discovery. The discovery information component receives the open P2P discovery information during the allocated wireless resources.

In Example 13, the blind sequence detection component of any of Examples 11-12 is optionally configured to determine the unknown reference signal sequence by comparing the reference signal with one or more potential cyclic shifts for a base sequence.

In Example 14, the blind sequence detection component of any of Examples 11-13 is optionally configured to determine the unknown reference signal sequence by comparing the reference signal with one or more potential orthogonal cover codes for a base sequence.

In Example 15, the unknown reference signal sequence of any of Examples 11-14 includes a DM-RS.

In Example 16, the device of any of Examples 11-15 optionally includes one or more of, a processor, an antenna, a display, a speaker, and a user input interface.

Example 17 is a UE that includes a reference signal component, a guard period component, and a transmission component. The reference signal component is configured to randomly select a sequence for a reference signal for transmission in an open D2D discovery packet. The guard period component is configured to determine a first symbol signal for transmission during a first symbol of the D2D discovery packet, wherein the first symbol includes a partially punctured symbol. The transmission component is configured to transmit the D2D discovery packet. The D2D discovery packet includes the first symbol having the partially punctured symbol and a reference signal based on the randomly selected sequence.

In Example 18, the guard period component of Example 17 optionally determines the partially punctured symbol by determining a repeating signal during the first symbol.

In Example 19, the transmission component of any of Examples 17-18 optionally transmits the first symbol of the discovery packet without power on a fraction of the plurality of subcarriers based on a RPF, wherein the fraction comprises (RPF-1)/RPF. The RPF corresponds to a number of times that the repeating signal repeats.

In Example 20, the reference signal of any of Examples 17-19 is transmitted during a first symbol of each resource block of the D2D discovery packet.

Example 21 is a method for D2D discovery. The method includes receiving a message from a base station allocating licensed wireless resources for D2D discovery. The method includes determining a random sequence for a reference signal for the licensed wireless resources. The reference signal includes an LTE PUSCH DM-RS. The method includes transmitting D2D discovery information during the allocated licensed resources. The method includes transmitting a reference signal based on the random sequence.

In Example 22, the reference signal of Example 21 is transmitted during a fourth symbol and tenth symbol of each resource block of the allocated licensed wireless resource in the normal cyclic prefix case and during a third symbol and ninth symbol of each resource block in the extended cyclic prefix case.

In Example 23, determining the random sequence in any of Examples 21-22 optionally includes randomly selecting an orthogonal cover code for a base sequence.

In Example 24, determining the random sequence in any of Examples 21-23 optionally includes selecting the random sequence comprises selecting a cyclic shift for a base sequence.

In Example 25, transmitting the D2D discovery information of any of Examples 21-24 optionally includes transmitting an open discovery packet.

Example 26 is a method for D2D discovery. The method includes receiving, with a radio in a reception mode, a downlink transmission from a radio access network. The method includes switching the radio from the reception mode to a transmission mode. The method includes transmitting a D2D discovery packet during an OFDM resource block. Transmitting the D2D discovery packet includes transmitting a first symbol of the OFDM resource block having a guard period.

In Example 27, transmitting the first symbol including a guard period in Example 26 optionally transmitting the first symbol with an unused first portion of the first symbol and a used portion of the first symbol, wherein the first portion precedes the second portion in time.

In Example 28, the first portion of the first symbol of Example 27 optionally has a length of about 20 milliseconds or more.

In Example 29, the first portion of the first symbol of any of Examples 27-28 optionally includes about one-third of the first symbol.

In Example 30, the first portion of the first symbol of any of Examples 27-28 optionally includes comprises about one-half of the first symbol.

Example 31 is a method for open P2P discovery in a 3GPP LTE protocol. The method includes receiving open P2P discovery information. The discovery information includes a reference signal transmitted by a source wireless communication device using an unknown reference signal sequence. The method includes determining the unknown reference signal sequence. The method includes estimating a channel between the device and the source wireless communication device based on the reference signal.

In Example 32, the method of Example 31 optionally further includes receiving a message from a 3GPP LTE network infrastructure allocating licensed wireless resources for P2P discovery. The open P2P discovery information may be received during the allocated wireless resources.

In Example 33, determining the unknown reference signal sequence of any of Examples 31-32 optionally includes comparing the reference signal with one or more potential cyclic shifts for a base sequence.

In Example 34, determining the unknown reference signal sequence of any of Examples 31-33 optionally includes comparing the reference signal with one or more potential orthogonal cover codes for a base sequence.

In Example 35, the unknown reference signal sequence of any of Examples 31-34 includes a DM-RS.

Example 36 is a method for D2D discovery. The method includes randomly selecting a sequence for a reference signal for transmission in an open D2D discovery packet. The method includes determining a first symbol signal for transmission during a first symbol of the D2D discovery packet, wherein the first symbol includes a partially punctured symbol. The method includes transmitting the D2D discovery packet. The D2D discovery packet includes the first symbol having the partially punctured symbol and a reference signal based on the randomly selected sequence.

In Example 37, determining the first symbol of Example 16 optionally includes determining a repeating signal during the first symbol.

In Example 38, transmitting the first symbol of any of Examples 36-37 optionally includes transmitting the first symbol of the discovery packet without power on a fraction of the plurality of subcarriers based on a RPF, wherein the fraction comprises (RPF-1)/RPF. The RPF corresponds to a number of times that the repeating signal repeats.

In Example 39, the reference signal of any of Examples 36-38 is transmitted during a first symbol of each resource block of the D2D discovery packet.

Example 40 is an apparatus including means to perform a method in any of Examples 21-39.

Example 41 is a machine readable storage including machine-readable instructions, when executed, to implement a method or realize an apparatus of any of Examples 21-40.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. User equipment (UE) comprising:
  a radio configured to transmit and receive signals in a licensed wireless spectrum;
  a receiver component configured to receive, with the radio in a reception mode, a downlink transmission from a radio access network;
  a communication mode component configured to switch the UE from the reception mode to a transmission mode; and
  a transmission component configured to transmit a device-to-device discovery packet during an orthogonal frequency division multiplexing (OFDM) resource block, wherein:
  transmitting the device-to-device discovery packet comprises transmitting a first symbol of the OFDM resource block comprising a guard period; and
  the guard period is a signal for the first symbol that does not include power in a first portion of the first symbol and has power or information during a second portion of the first symbol, wherein the first portion precedes the second portion.

2. The UE of claim 1, wherein transmitting the first symbol comprising the guard period comprises transmitting the first symbol with an unused portion of the first symbol and a used portion of the first symbol, wherein the unused portion precedes the used portion in time.

3. The UE of claim 2, wherein the unused portion of the first symbol comprises about 20 milliseconds or more.

4. The UE of claim 2, wherein the unused portion of the first symbol comprises about one-third of the first symbol.

5. The UE of claim 2, wherein the unused portion of the first symbol comprises about one-half of the first symbol.

* * * * *